FIG. I

INVENTOR.
ANTON J. HAUG

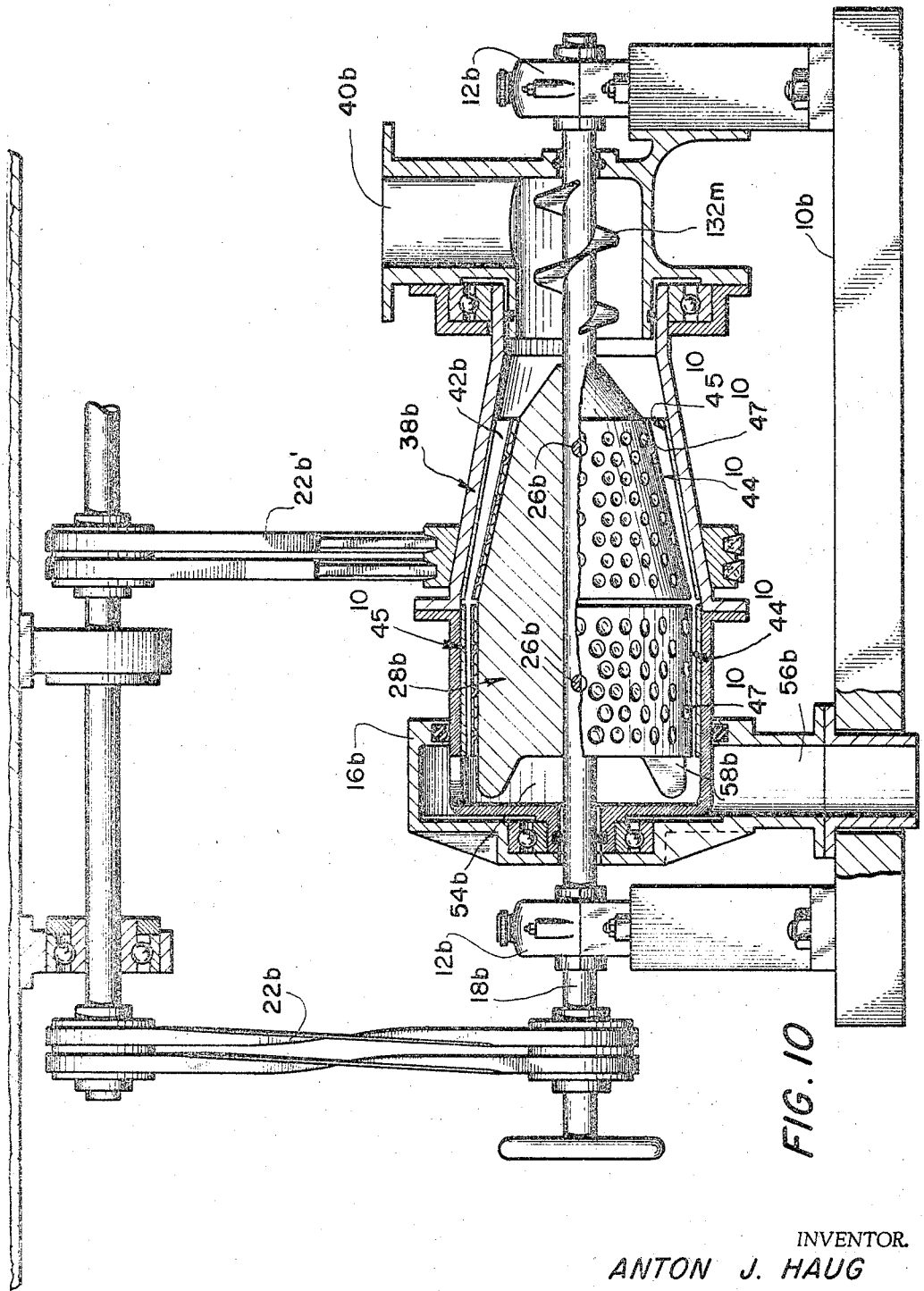

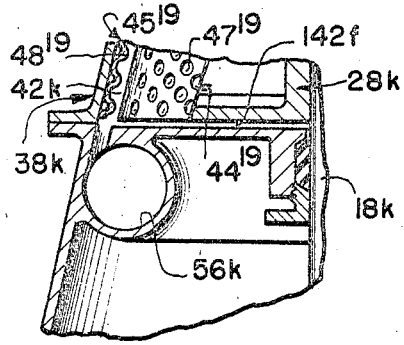
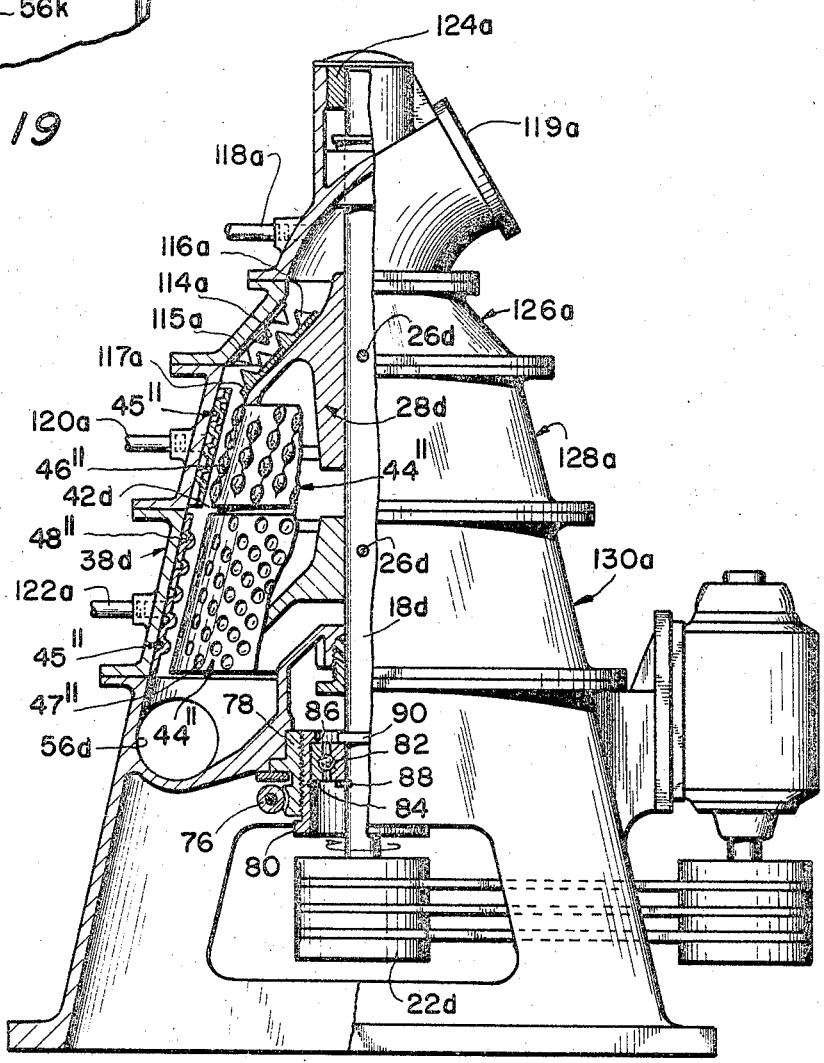
FIG. 19
FIG. 11
INVENTOR.
ANTON J. HAUG
ATTORNEY

INVENTOR.
ANTON J. HAUG
ATTORNEY

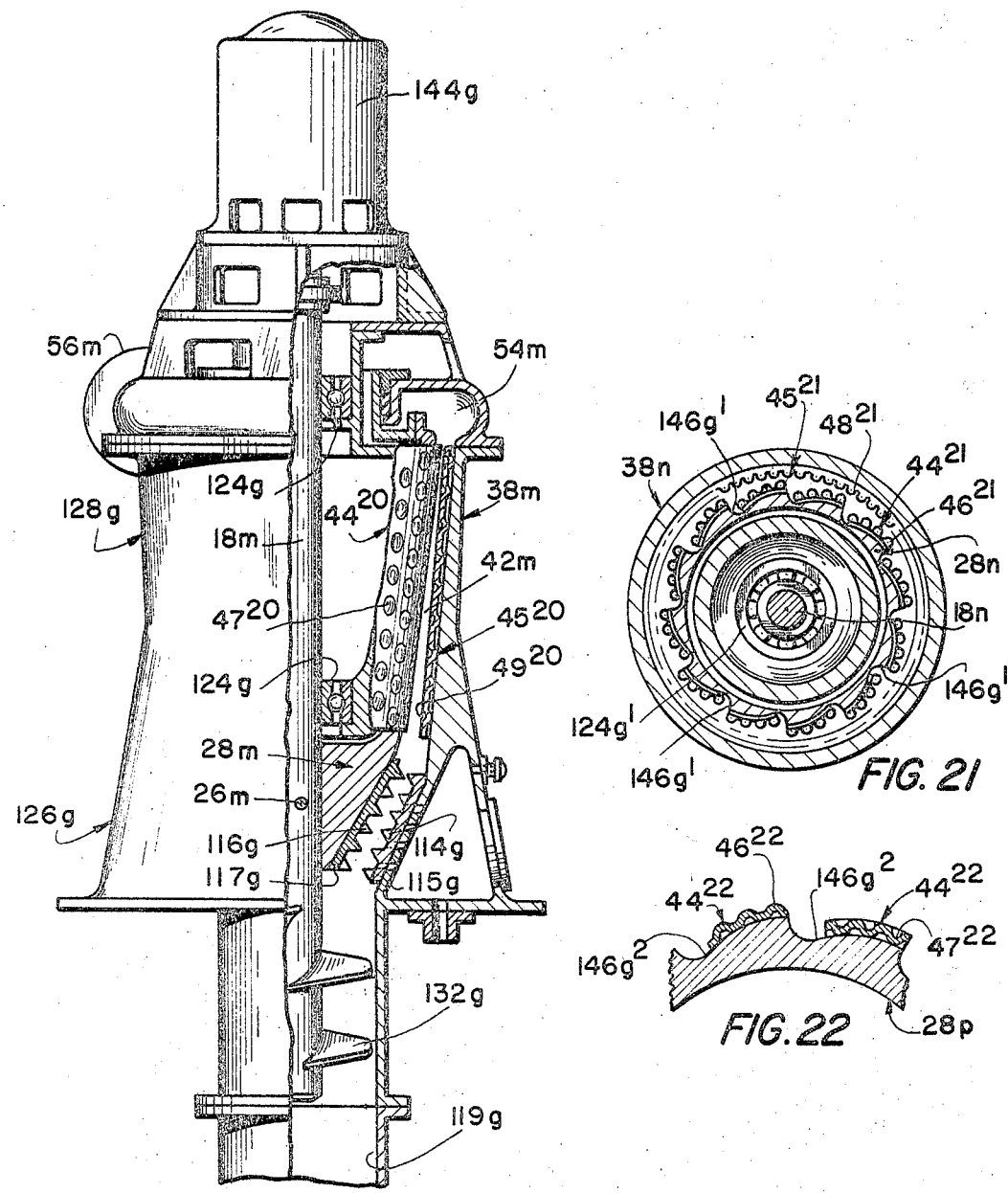

INVENTOR.
ANTON J. HAUG

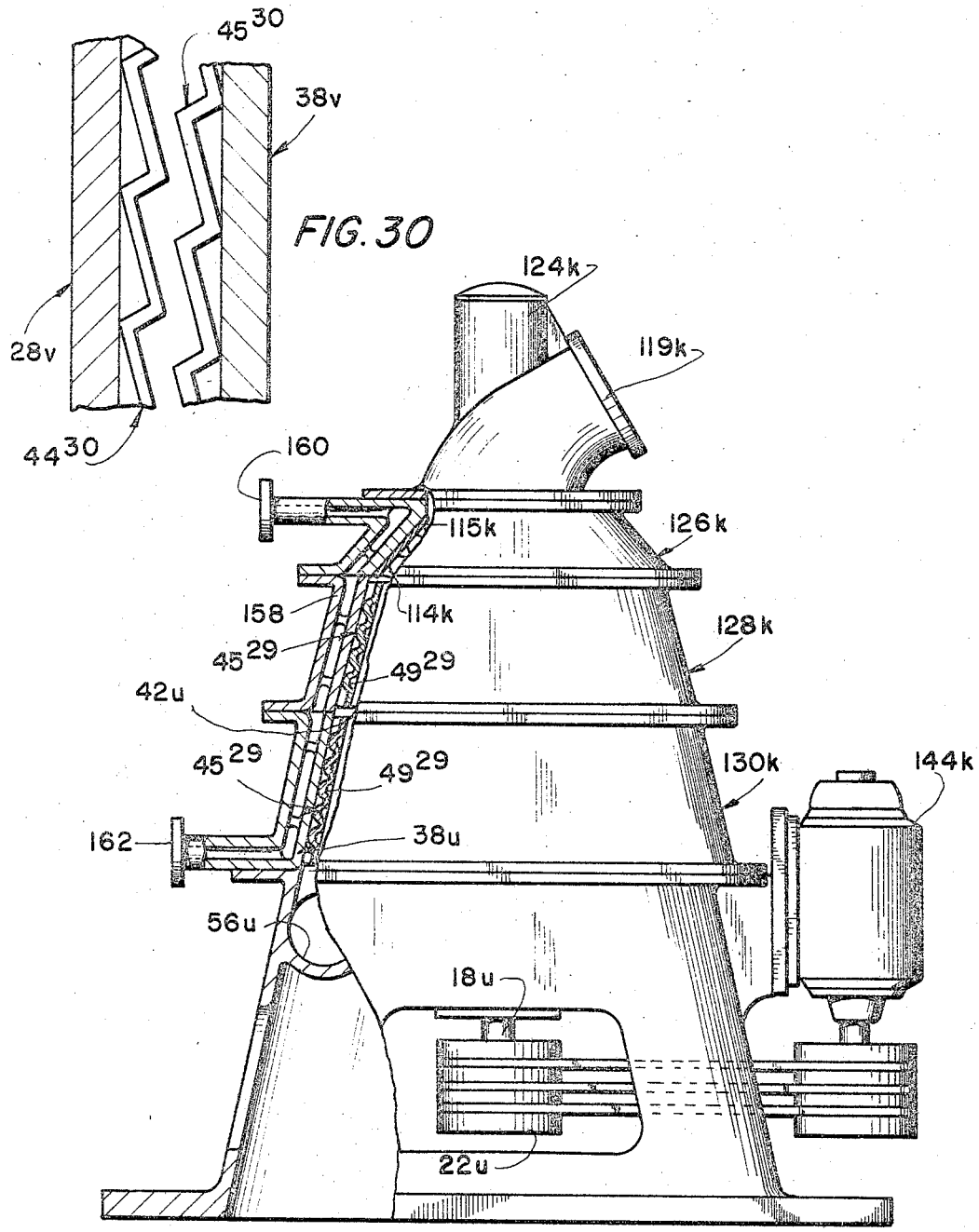

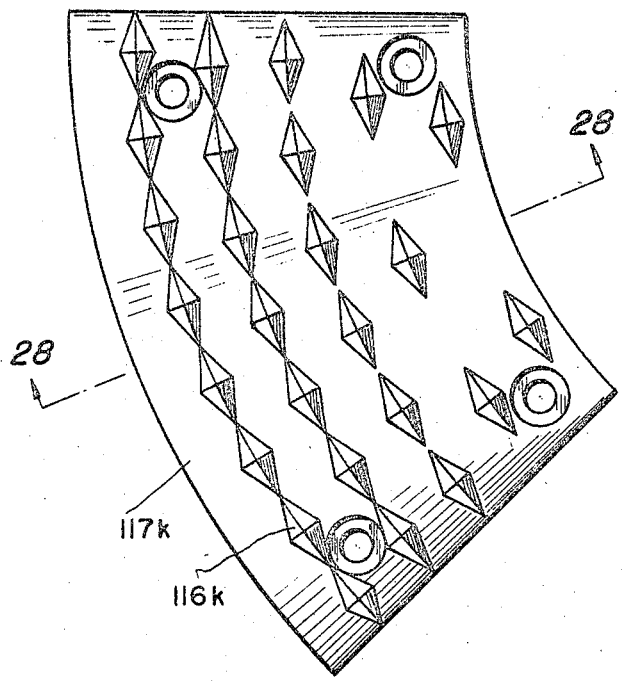
FIG. 27
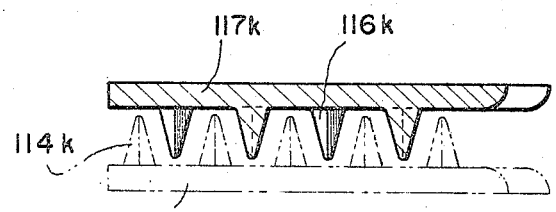
FIG. 28
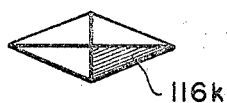
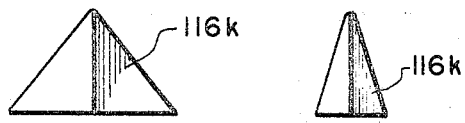
FIG. 15

United States Patent Office 3,427,690
Patented Feb. 18, 1969

3,427,690
APPARATUS FOR WORKING FIBROUS MATERIALS
Anton J. Haug, Nashua, N.H., assignor, by mesne assignments, to Marie J. Doyle, executrix for the estate of Anton J. Haug, deceased
Continuation of application Ser. No. 248,018, Dec. 28, 1962. This application Oct. 17, 1966, Ser. No. 569,537
U.S. Cl. 19—66                                    24 Claims
Int. Cl. D01b *3/04;* B02c *15/10, 7/06*

ABSTRACT OF THE DISCLOSURE

Apparatus and method for processing a fluid mass of fibrous material comprising a pair of fiber working members concentrically arranged in spaced-apart relation to define a fiber passageway, means for producing relative rotative movement between the fiber working members, first smooth, rounded fiber compressing means or working face on one of the fiber working members and second smooth, rounded fiber compressing means or working face on the other fiber working member, the first and second fiber compressing means being operable to alternately compress and then release the fibrous material at a rate greater than two cycles per second. Also is disclosed shredding means disposed along the fiber passageway to break-up large slivers and chips in the fibrous material. Further along the passageway refining means are provided for refining the shredded fibrous material. Additionally, means are provided for cutting and filtering the fibrous material.

---

This application is a continuation of application Ser. No. 248,018, filed Dec. 28, 1962, now abandoned.

This invention relates to paper making apparatus and more particularly to improved process and apparatus of the type shown in U.S. Patent No. 2,749,814, issued June 12, 1956, to A. J. Haug for refining fibrous materials.

In heretofore conventional processes and apparatus for processing pulp fibers (which comprise cellulose fibrils joined together by lignin) and preparing these fibers, it has been usual to seek fibrillation of the fibers without unnecessary cutting or shortening of the fibers. Fibrillation is the treatment of fibers to produce separated fibrils at the ends of the fibers and along the fiber bodies. This fibrillation of the fibers combined with the penetration of water, known as "hydration" of the fibers, produces desirable characteristics leading to good formation on the paper machine wire and adequate strength in the final product, which is paper.

A more or less standard explanation of the reason for paper pulp refining is that the fibers must be mechanically worked in order to produce hydration, fibrillation, or deshiving (which deshiving comprises the separation of bundles of fibers into separate or individual fibers) to the extent required by the end product, such as newsprint, wrapping paper, box board containers, food containers, building products such as roofing paper, wall paper, asphalt impregnated shingles, tar paper, sanitary papers, writing and book papers, drafting paper, bank note paper and legal papers, heel and toe counters, rayon fibers from high grade bleached cellulose fiber having all lignin removed and nitro celluose gum cotton. These characteristics cover a wide range from loose fiber structure in the paper sheet with high absorbency to a hard transparent sheet with high density. A hydrated fiber is a thoroughly "wetted" fiber, a fibrillated fiber has at least some of its fibrils partially separated from its main body, and a deshived fiber is a fiber that is not stuck to other fibers.

To be able to treat the fibers uniformly and to have complete control over the degree of stress (i.e. work or energy) to which each fiber is subjected is most important. Stressing or working a fiber in the presence of water changes the physical size and shape of the fiber and its degree of hydration or "wetness," and may also, under some conditions, change the chemical nature of some of the cellulose fibrils of the fiber when chemically combined with lignin and water.

The conventional processes and apparatus used in the refining field have been limited to the roll or cylinder refiner such as disclosed in U.S. Patent No. 1,302,469 issued Apr. 29, 1919 to A. J. Haug and in U.S. Patent No. 1,682,511 issued Aug. 28, 1928 to A. J. Haug; the conical plug refiner, such as the Jordan machine; or the disc type refiner.

These conventional processes and apparatus provided insufficient fibrillation; reduced the length of the refined fibers; changed the characteristics of the refined fibers in a detrimental way by reducing some of the fibers to debris and unnecessarily decreasing the "freeness" (i.e., ability of the fibers to give up its water); were not adapted to handle all types of fibrous material or to provide the proper control over the desired degree of refinement of a particular fiber; utilized high horsepower/ton of refined fiber; required expensive maintenance with attendant down time; were unreliable in operation; were noisy and vibrated excessively; were massive; and consumed large areas of factory floor space.

Further, in disc refiners the mass of fibers cannot be maintained satisfactorily on the disc surfaces for fiber to fiber treatment because the predominant force (due to the rotation of the discs and the centrifugal forces set up in the pulp) is outward across the disc surfaces. It is necessary, therefore, to operate these machines with very close clearances between the working surfaces. They rely chiefly on the close co-operation between the opposing edges of the grooves to crush, rub or cut the fibers, and work generally with working proximities between surfaces of normally about four fiber diameters. Because of this condition and the short path through which the fibers travel from the inner to the outer disc rim, the action has to be very severe, resulting in the apparently unavoidable high percentage of chop or fiber debris common to this type of refiner.

In the conventional Jordan type of refiner clearances between plug and shell are also kept very close. One portion of the fibers is cut or crushed on or at the edges of the bars while another protion moves along in the grooves between the bars and is not treated at all.

Efforts to slow down the passage of fibers over the working surfaces on disc refiners and Jordan type of refiner do not materially alter the need for close clearances on these machines which depend entirely on the bar or groove edges for refining.

It is the general object of the present invention to avoid and overcome the foregoing and other difficulties of and objections to prior art practices by the provision of an improved method and apparatus for working fibrous materials, which method and apparatus provides adequate fibrillation; does not sever the refined fibers unless desired; does not change the characteristic of the refined fibers in a detrimental way, is adapted to provide refinement of all types of fibrous material and quality control over individual types of fibers; utilizes a low horsepower/ton of refined fiber, is inexpensive to maintain and is reliable in operation, provides quite and vibrationless operation, is simple and rugged in structure and occupies a minimum of factory floor space.

Another object of the present invention is the provision of an improved refining method and apparatus which produces controlled refinement of fibrous material heretofore obtained conventionally by a plurality of refiners or equivalent machines in series.

Yet another object of the present invention is the provision of an improved refining method and apparatus which is adapted to receive stock of higher consistencies than heretofore received by conventional apparatus.

A further object of the present invention is the provision of an improved refining method and apparatus which increases the refining effect and the fluidity of the stock under treatment with resultant improved fibrillation and hydration, the improved refining apparatus being smaller than conventional apparatus and operable at lower horsepower expenditure than conventional apparatus.

A still further object of the present invention is the provision of an improved refining method and apparatus which utilizes inexpensive readily replaceable working surfaces on the fiber working members thereby reducing the cost of and time for maintenance.

Still another object of the present invention is the provision of an improved refining method and apparatus which permits the facile introduction of chemicals, water, etc., at various stages of the combined refining method and apparatus and which permits the removal of refined stock at any desired stage of the refinement operation.

An added object of the present invention is the provision of an improved refining method and apparatus which settles out grit and heavy dirt, screens the stock, and shortens the refined stock if desired.

Another object of the present invention is the provision of an improved refining method and apparatus which produces improved characteristics in the paper such as tensile strength, bursting strength, tear strength and freeness as compared to paper produced by conventional refining methods and apparatus.

A further object of the present invention is the provision of an improved refining method and apparatus which can treat or work the fibers while such fibers are under hydraulic pressure.

Yet another object of the present invention is the provision of an improved refining method and apparatus which is adapted to fit into modern pulp preparation systems.

A further object of the present invention is the provision of an improved refining method and apparatus which separates the fiber bundles without fiber fracture but is adapted to shorten the refined fibers for certain paper sheet requirements.

A still further object of the present invention is the provision of an improved refining apparatus which is readily, quickly and economically adapted to produce paper making pulps covering the entire range of requirements in the paper industry.

The aforesaid objects of the present invention, and other objects which will become apparent as the description proceeds, are achieved by providing an improved method of processing fibrous material which comprises the steps of conducting a fluid stream of fibrous material through an annular conduit and simultaneously alternately compressing the fibrous material and then releasing the fibrous material at a rate greater than two hundred cycles per second.

The improved apparatus for processing a fluid mass of fibrous material comprises a pair of fiber working members concentrically arranged in spaced-apart relation to define an annular fiber passageway, means for producing relative rotative movement between the fiber working members, first fiber compressing means on one of the fiber working members and second fiber compressing means on the other fiber working member defining annular working faces, the first and second compressing means being operable to alternately compress and then release the fibrous material at a rate greater than two hundred cycles per second. Other improved apparatus for processing a fluid mass of fibrous material is also provided which comprises a pair of fiber working members concentrically arranged in spaced-apart relation to define a fiber passageway. Shredding means are disposed along the fiber passageway to break-up large slivers and chips in the fibrous material. Further along the fiber passageway refining means are disposed for refining the shredded fibrous material.

For a better understanding of the present invention reference should be had to the accompanying drawings, wherein like numerals of reference indicate similar parts throughout the several views and wherein:

FIG. 1 is a view similar to FIG. 1 of U.S. Patent No. 2,749,814 issued June 12, 1956 to A. J. Haug and showing the improved refining apparatus of the present invention, embodying the embodiment shown in FIG. 3 and showing the inner fiber working member as the driven element.

FIG. 10 is a view similar to FIGS. 1 and 9 showing both the outer fiber working member and the inner fiber working member rotating but in opposite directions;

Figure 1:
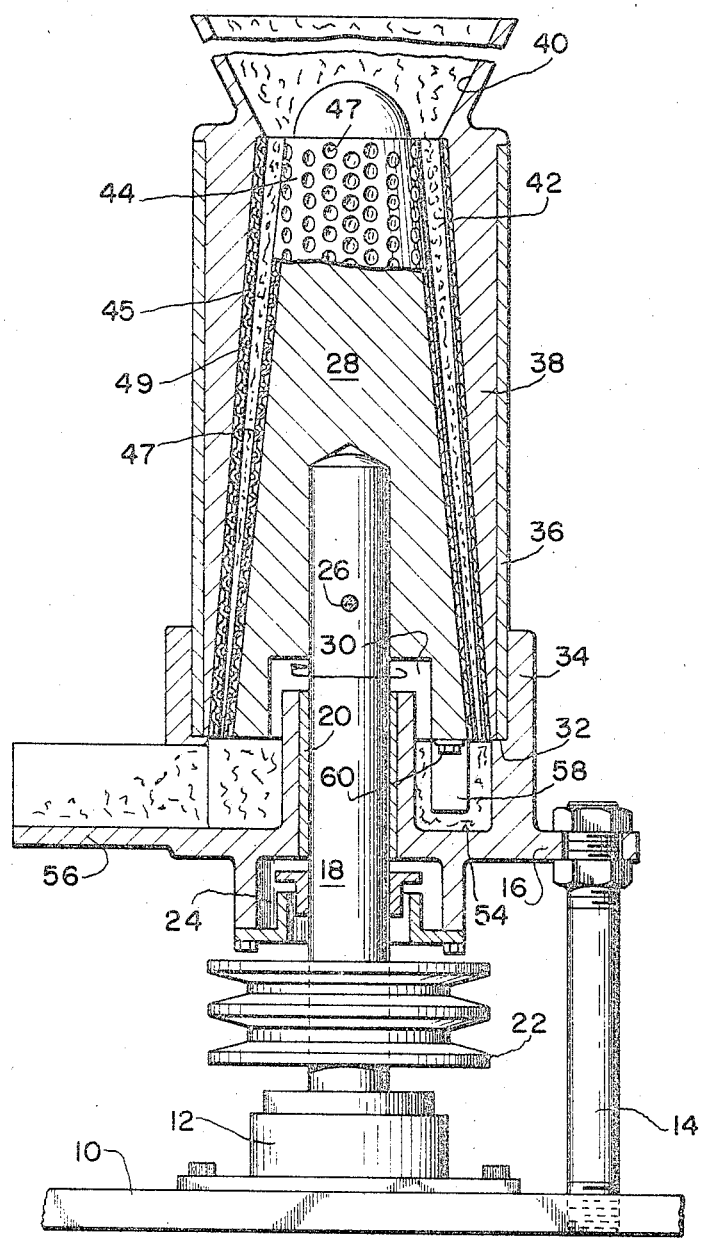
Figure 12:
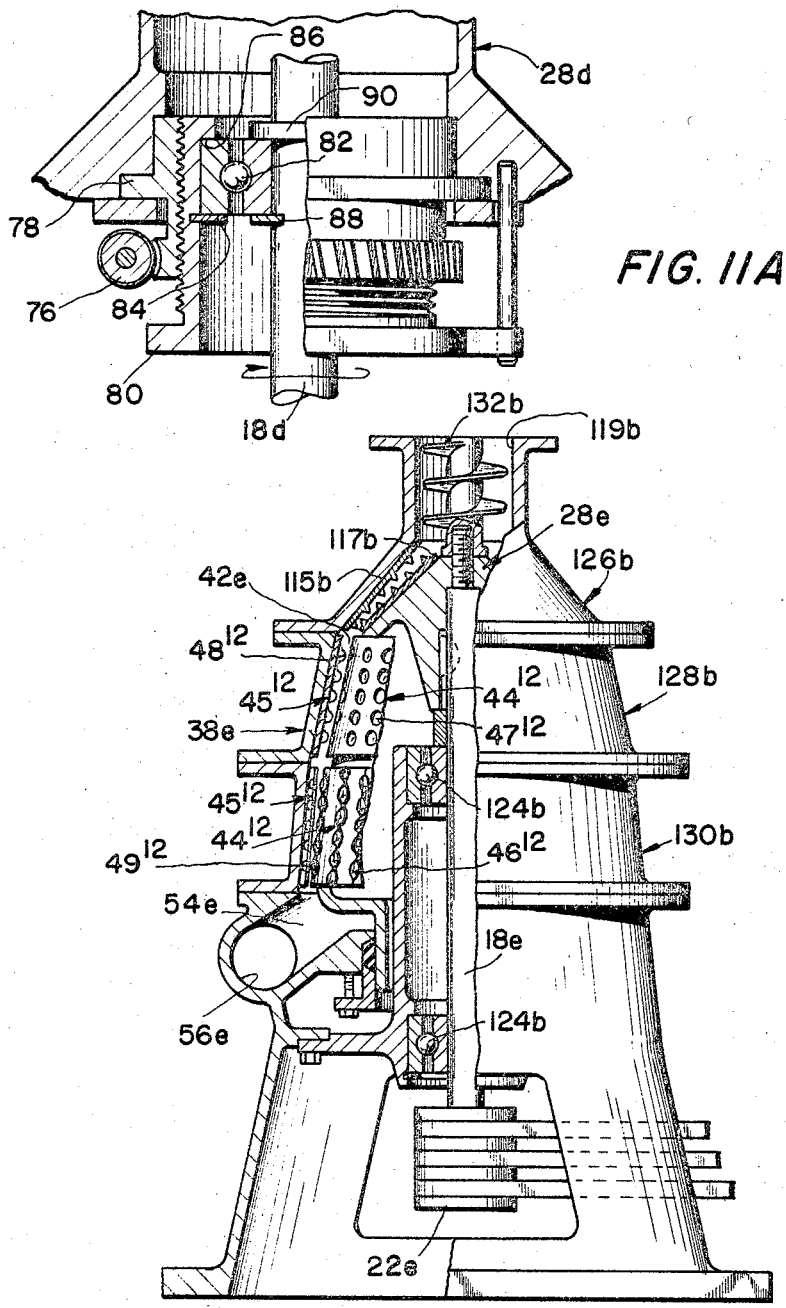
Figure 13:
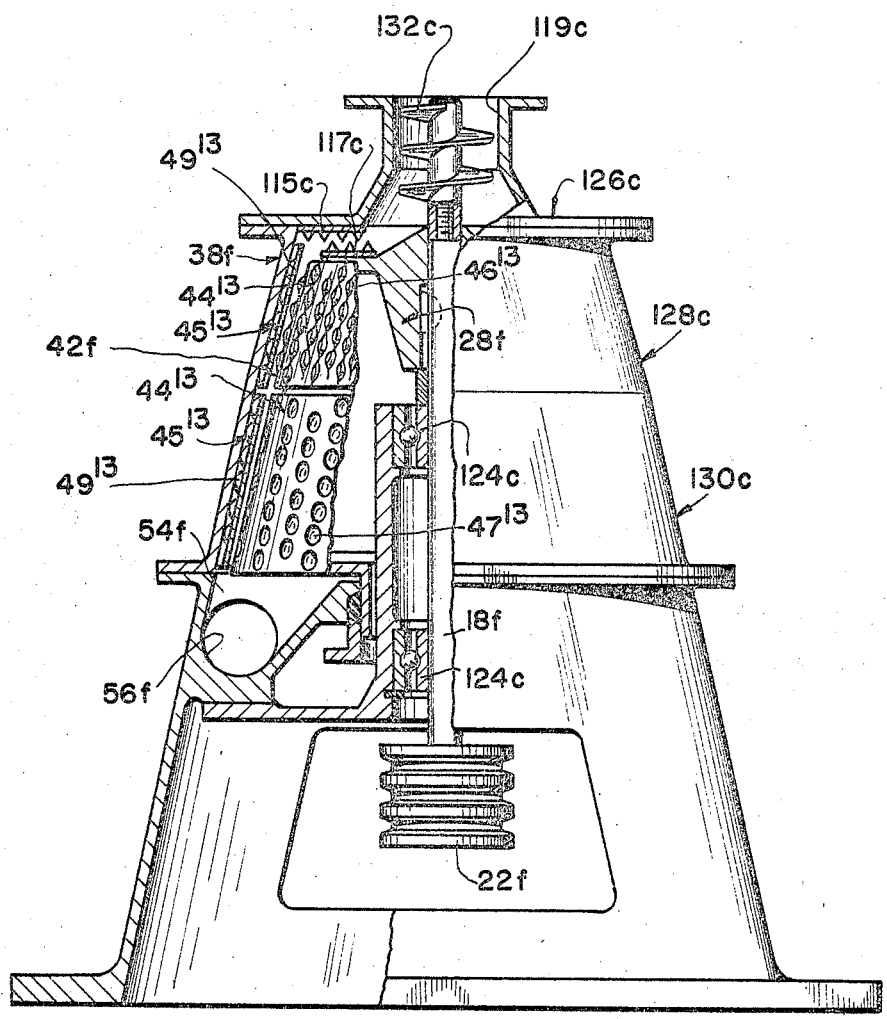
Figure 14:
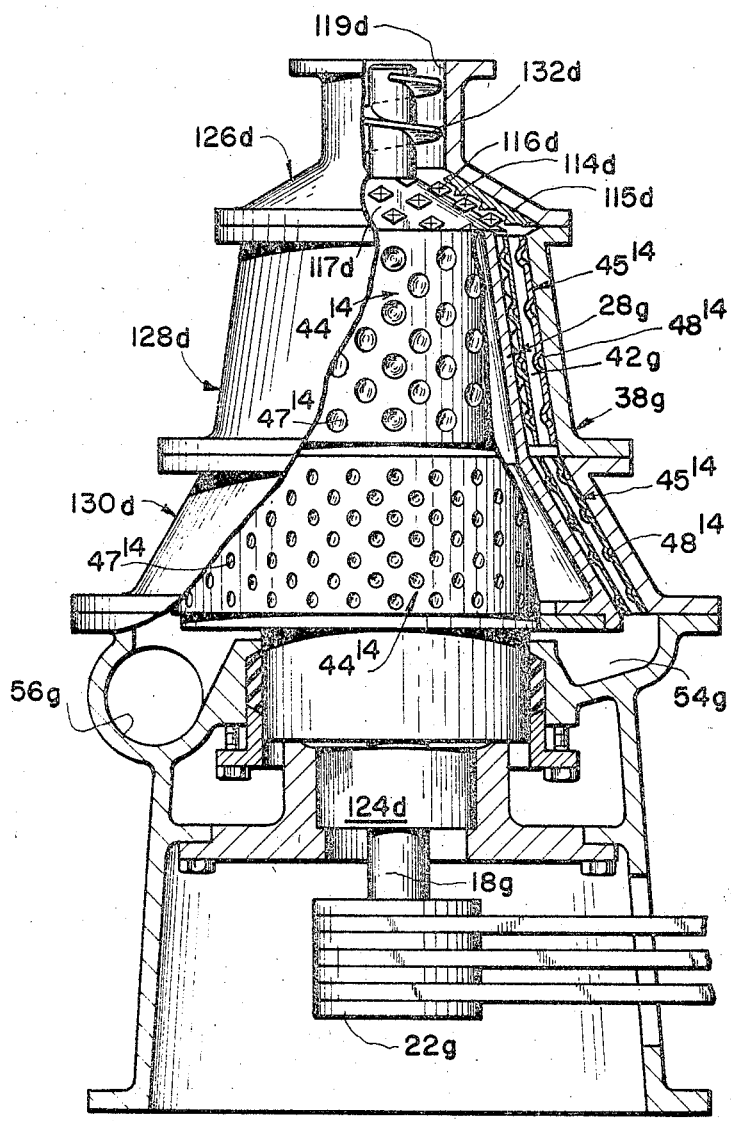
Figure 16:
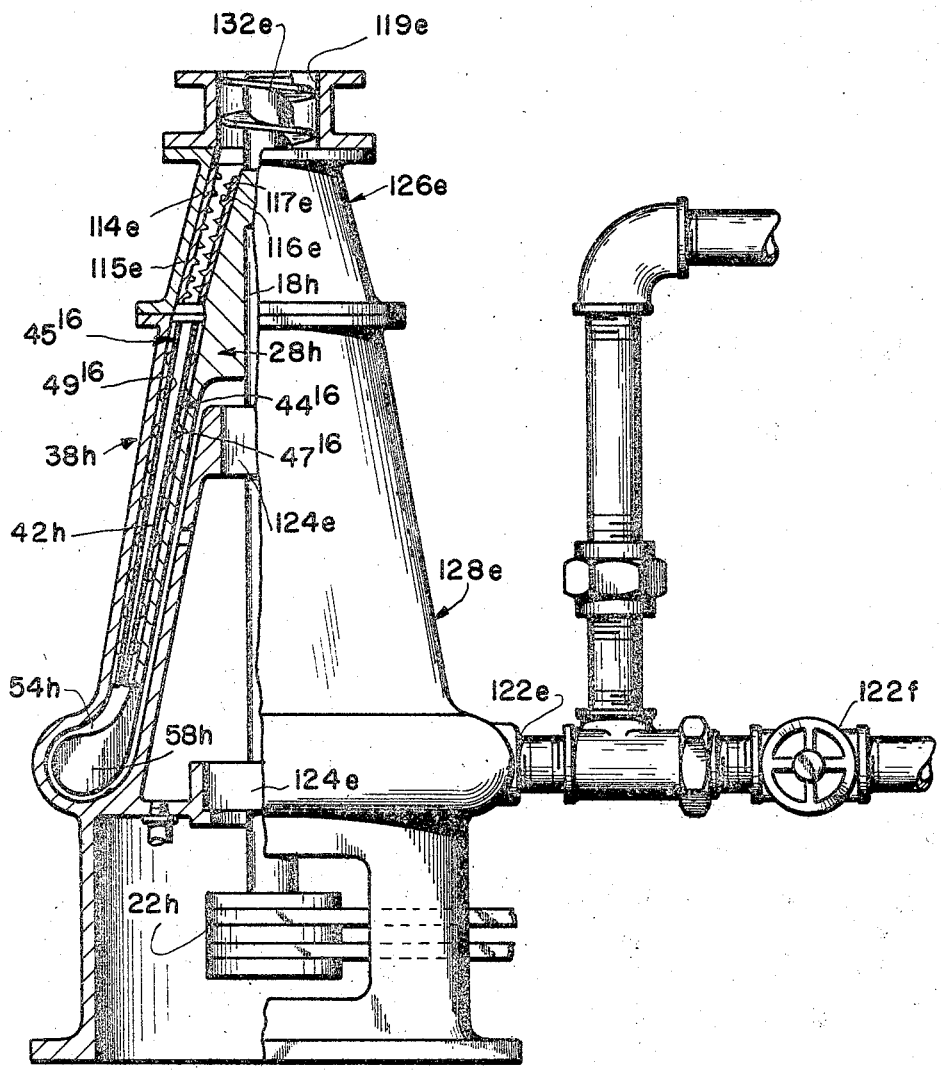
Figure 17:
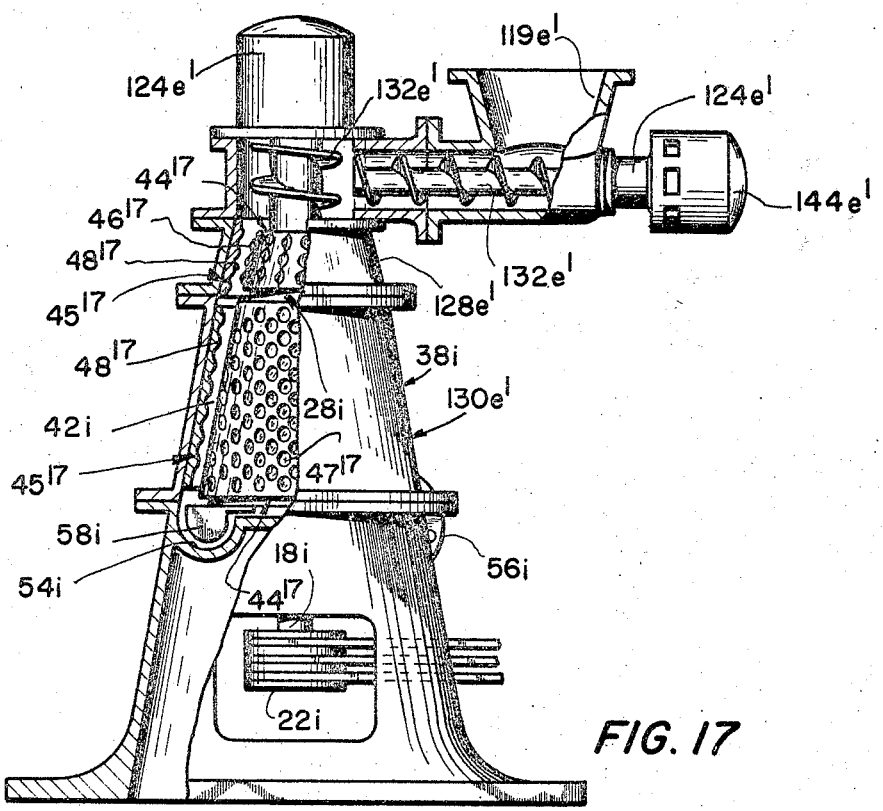
Figure 18:
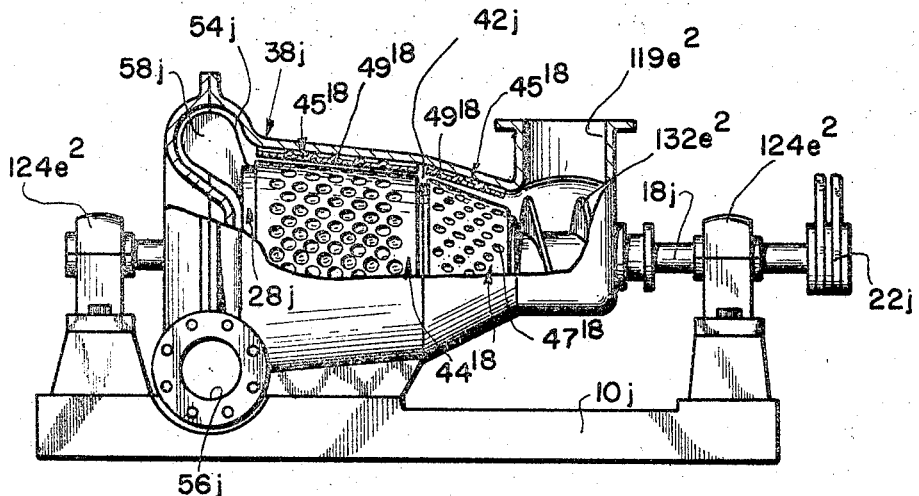
Figure 23:
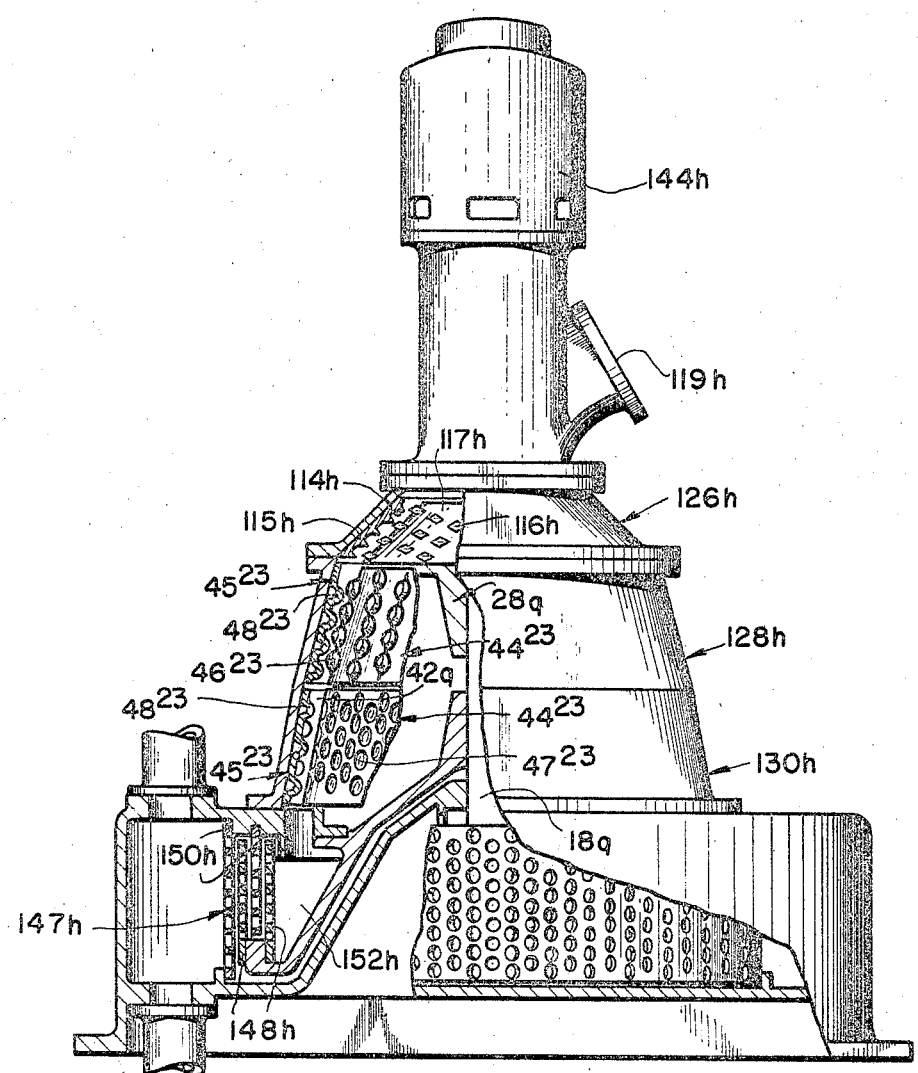
Figure 24:
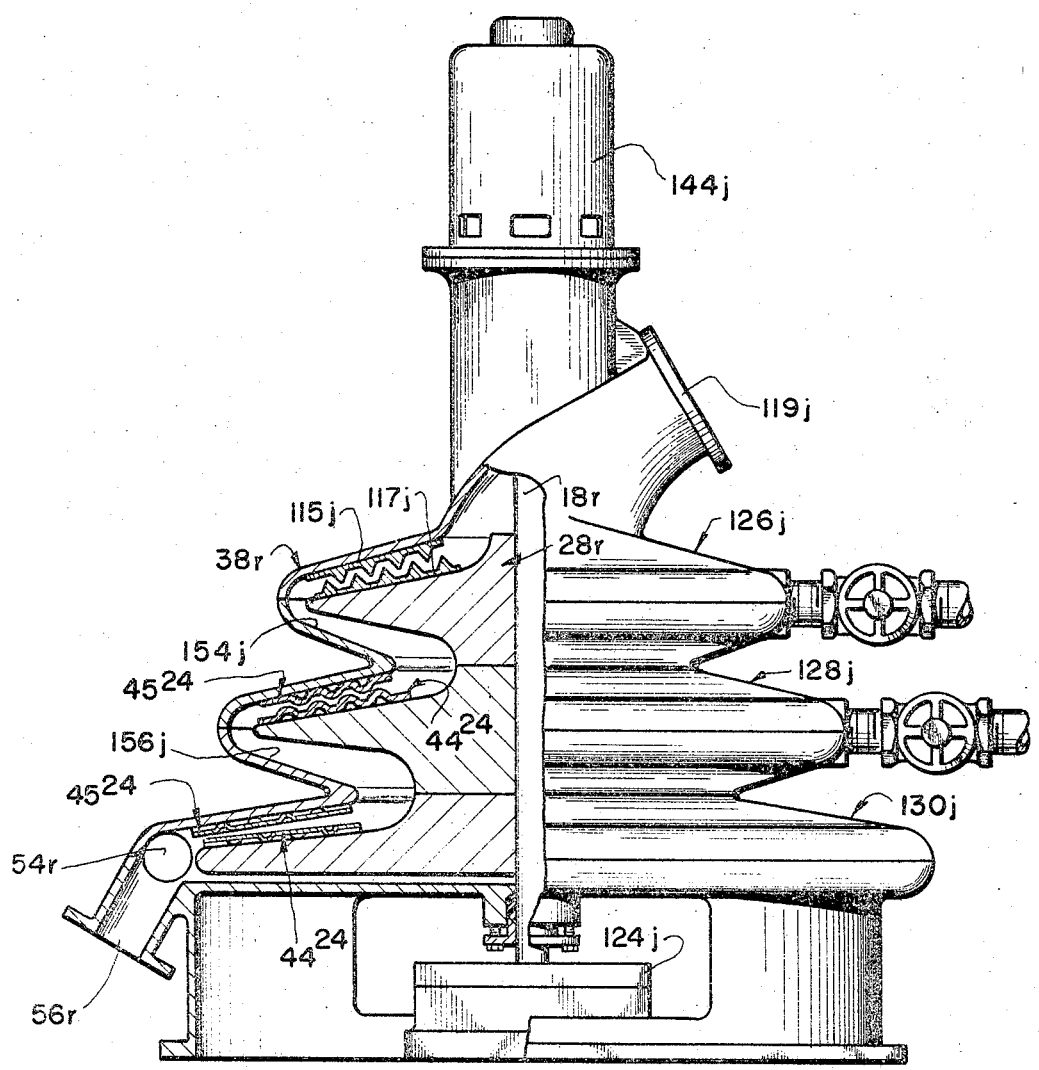
Figure 25:
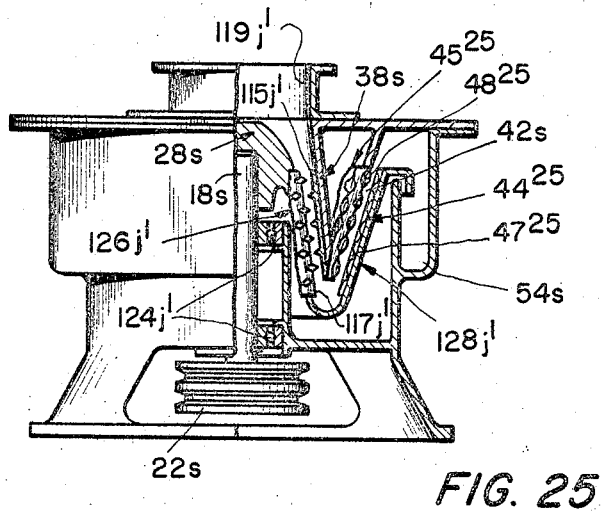
Figure 26:
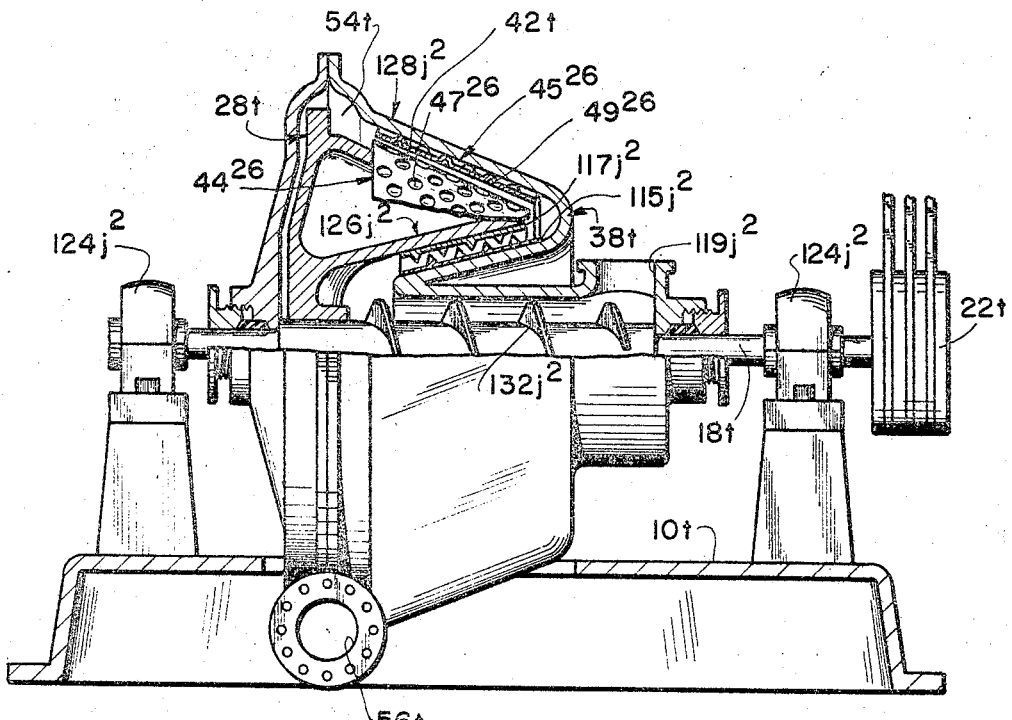

FIG. 11 is a view similar to FIG. 1 of such U.S. Patent No. 2,749,814, but showing a series of refining operations including a shredder section containing large teeth for breaking up large slivers or chips, a coarse refining section, and a fine refining section, each section adapted to be provided with outlets and inlets so that one or more sections may be used as required and also showing a sleeve member positioning device, thereby permitting the introduction of chemicals and/or water at each section, and accomplishing in one machine the functions of many machines without loss of heat and the use of interstage pumps;

FIG. 11A is an enlarged fragmentary view of the positioning device shown in FIG. 11;

FIG. 12 is a view similar to FIG. 11 showing the inlet provided with a screw feed device to provide more uniform feed, and inboard bearings to enable a straight through-feed;

FIG. 13 is a view similar to FIG. 12 showing inboard bearings and a horizontal shredder section;

FIG. 14 is a view similar to FIG. 12 showing a flatter cone in the fine refining section;

FIG. 15 is a detail of the teeth in the shredder section the teeth being of the type shown in U.S. Patent 2,950,064 issued Aug. 23, 1960 to A. J. Haug;

FIG. 16 is an embodiment similar to FIGS. 11–14 showing a two section machine having a shredder section and a steep angled refining section and means for providing back pressure on the apparatus;

FIG. 17 is an alternative embodiment of FIG. 16 utilizing an outboard bearing and a horizontal screw type feeding device;

FIG. 18 is a further alternative of the machine shown in FIG. 17 utilized in the horizontal position as a pressurized refiner;

FIG. 19 is a fragmentary view showing a novel restricted discharge passage providing means to eliminate the accumulation of the stock therein;

FIG. 20 is a view similiar to FIG. 11 showing the drive means on top and the flow of pulp upwardly;

FIG. 21 is a plan view of an improved step type rotor similar to that shown in such U.S. Patent No. 2,749,814;

FIG. 22 is an enlarged side elevational view of two steps on the rotor shown in FIG. 21, one step being provided with protrusions and the other step being provided with depressions for illustrative purposes only;

FIG. 23 is a view similar to FIG. 11 showing a top mounted drive means and cutting means comprising a pair of foraminous rotating cylinders and a pair of foraminous stationary cylinders;

FIG. 24 is a view similar to FIG. 23 showing the hydraulic or pressure activated return of the stock inwardly after it passes through each section, thereby reducing the width of the machine;

FIG. 25 is a view similiar to FIG. 24 utilizing a vertical V-shaped cross sectional stock path;

FIG. 26 is a view similar to FIG. 25 utilizing a horizontal V-shaped cross sectional stock path and a horizontal screw feed device capable of reverse operation;

FIG. 27 is a fragmentary plan view of a teeth arrangement in the shredding section of the rotor, the teeth being of the type shown in such U.S. Patent No. 2,950,064;

FIG. 28 is a vertical sectional view along the line 28—28 of FIG. 27 in the direction of the arrows and showing the intermeshing stator teeth in phantom;

FIG. 29 is a view similar to FIG. 11 showing the use of a water jacket thereby permitting the introduction of heavier consistencies of stock without burning the refined stock;

FIG. 30 is a view similiar to FIGS. 2–6 showing the sleeve members provided with saw tooth protrusions in the refining sections to provide extreme high freeness and bulkiness in the refined paper pulp.

Although the principles of the present invention are broadly applicable to an improved method and apparatus for refining all types of fibrous material the present invention is particularly adapted for use in conjunction with a cone type refining apparatus and hence it has been so illustrated and will be so described.

With specific reference to the form of the present invention illustrated in the drawings, and referring particularly to FIG. 1, a base member of the improved refining apparatus is indicated generally by the reference numeral 10 and carries a bearing 12.

Adjustably supported in spaced relation above the base 10 on threaded spacing bolts 14 is a bearing plate member 16 of generally triangular shape, as may be more clearly seen from an inspection of FIG. 1. Rotatably received in the bearing 12 is one end of a power driven shaft 18. This member 18 at its intermediate portions is rotatably supported in a bushing 20 which is, in turn, secured in the plate membtr 16. Fixed to the shaft 18 is a pulley 22 driven by a belt which has not been shown, but which may be of a conventional type. Portions of the shaft 18 occurring between the bushing 20 and the pulley 22 extend through an oil trapping well 24, and by means of this arrangement the shaft 18 may be fully lubricated.

Fixed to the upper end of the shaft 18 by means of a pin 26 is a fiber working member or cone member or rotor or conically shaped body 28, which fiber working member 28 has a conically shaped formation with the base of the larger section of the cone occurring at the bottom of the member 28 as viewed in FIG. 1. The cone member 28 has its base recessed to provide an annular cavity 30 into which projects the bushing 20, as well as annular supporting portions of the bearing plate 16 in which the bushing 20 is fitted.

At its upper outer portions the bearing plate 16 is recessed to provide an annular shoulder 32 and an upstanding rim portion 34. Received on the shoulder 32 in fitted relationship within the rim 34 is a sleeve member 36 which supports an annular member or second fiber working member or stator or casing member 38 which constitutes the second fiber working member of the above described pair. The member 38 preferably consists of a stationary tubular body having a conically shaped opening formed axially therethrough and of a shape and size adapted to enclose and lie in slightly spaced relation with respect to the outer surface of the conically shaped fiber working member 28, and to thus define an annular conduit or fiber passageway 42. At its upper end the fiber working member 38 is provided with an inlet port 40 which communicates with the annular passageway 42 and constitutes a means of inducing fluid fibrous material into the machine, as has been diagrammatically indicated in FIG. 1.

When the fibers reach the bottom of the passageway 42 there is further provided an outlet chute 56 through which processed fibers may leave the machine and to facilitate exit of the fibers a cleaner element 58 may be provided, which element 58 consists of a vertically depending angle piece attached by a bolt 60 to the bottom of the conical member 28 as shown in FIG. 1.

In conventional refiners it has been found necessary to maintain very close clearances between the rotor 28 and stator 38 which define the fiber passageway 42. It has also been conventional to have the fiber passageway and clearances defined by sharp edges and bars, such as for example in the Jordan type of refiner. In the apparatus of the present invention it has been found that close clearances are not required thereby rendering it possible to gradually decrease the clearances from the inlet 40 to the outlet 56 of the fiber passageway 42. This decrease combined with the absence of conventional sharp edges or bars (now replaced by gently rounded protuberances) produce a type of fiber treatment resulting in reduced amounts of undesirable fiber chopping and in a more gradual application of the treatment to the fibers as such fibers progress along a narrowing fiber passageway 42.

In accordance with the invention the above described apparatus is employed to successfully work various fibrous material. In operation a fluid mass of fiber of some desired consistency is fed into the inlet port 40, and due to the conical shape of the sleeve member 44 on fiber working member 28 (FIG. 1) and sleeve member 45 on fiber working member 38, and also due to gravity, the fibrous material is gradually drawn toward the lower end of the fiber passageway 42; then into the discharge passageway 54; and finally out through the discharge chute 56.

The principle of the invention herein disclosed is to subject the liquid or semi-liquid mass of fibrous material to a very high number of hydraulic shocks. This is accomplished by forcing the fibrous mass through a zig-zag course, FIGS. 2–6, at a very high speed where at each change of direction the fibers are impacted against protrusions $46^2$, $48^2$, etc. formed on smooth flat surface $41^2$ of sleeves $44^2$, $45^2$, etc. (FIG. 2) or are impacted against depressions $47^3$, $49^3$, etc. (FIG. 3) (on or in sleeve members $44^2$, $45^2$, etc. on rotor $28^2$, etc. and stator $38^2$, etc. respectively, the protrusions and/or depressions forming working surfaces), at cyclic speeds of greater than 200 cycles per second up to 40,000 cycles per second and over or to force them into depressions $47^3$, $49^3$ (FIG. 3) etc. (FIGS. 2–6) with consequent releases at the same cyclic speeds. As the material meets only rounded protrusions $46^2$, $48^2$, etc. and/or depressions $47^3$, $49^3$ (FIGS. 2–6) and is in the form of a comparatively thick layer, it is essential that the intensity of the hydraulic shocks is such as to cause fiber separation and fiber treating (i.e., in the neighborhood of 1000 g. and over). As can be observed from the drawings, the above protrusions and the depressions form generally circular or hemispherical surfaces.

Figure 7A:
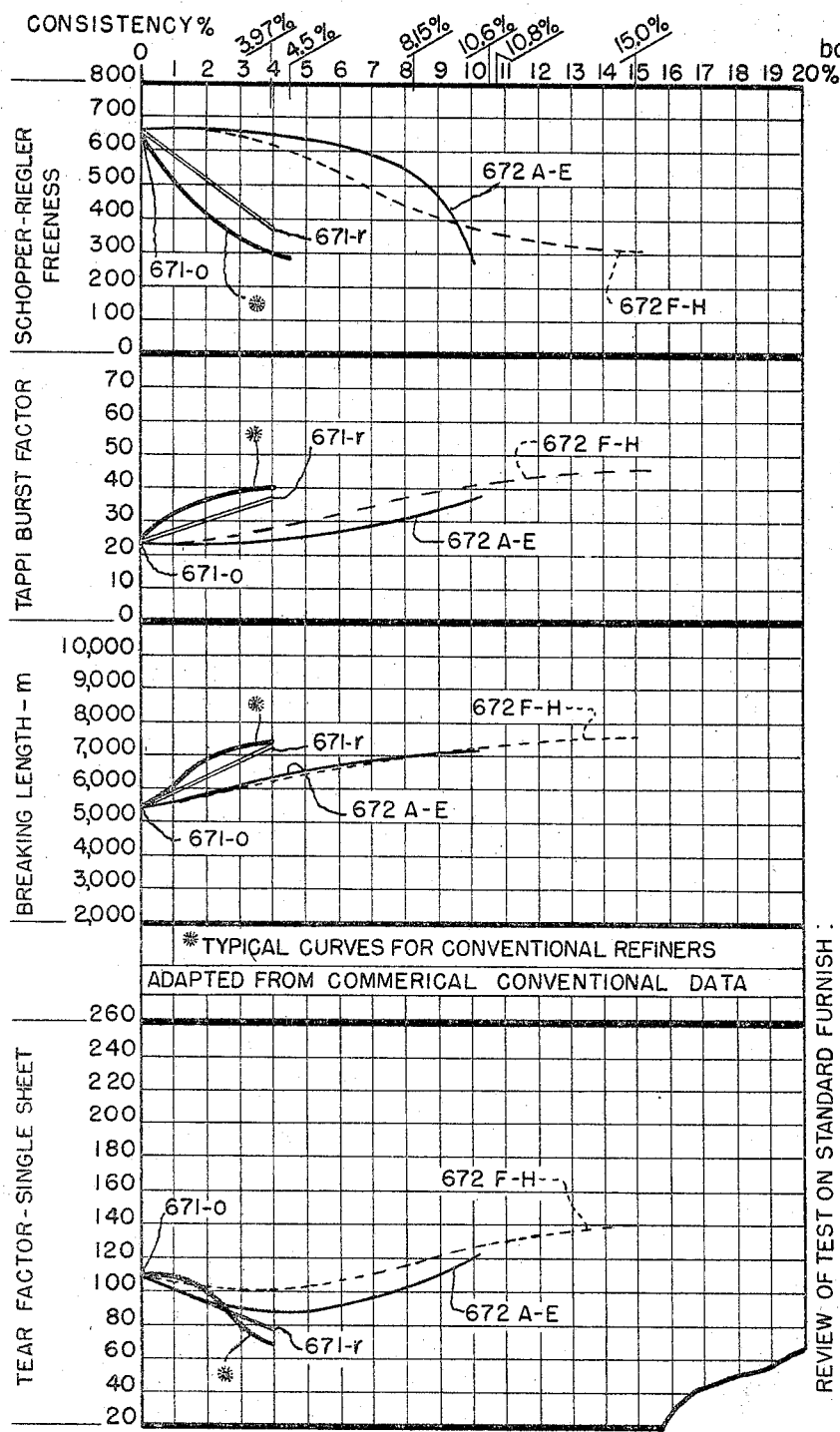
FIGS. 7A, 7B are graphs illustrating the improved results obtained by the improved refining method and apparatus of the present invention.

Before referring to FIG. 7A it will be understood that the characteristics shown therein are defined as follows:

Canadian freeness: Method used in Canada and throughout the world for newsprint paper stock for measuring ability of a fiber mat made from such paper stock to release its water and is measured on standard apparatus in arbitrary units.

Tappi Burst factor is a measure of the resistance to bursting the paper produced from a given paper stock and is measured on standard apparatus and connected to an arbitary factor.

Breaking length is the maximum length of paper which can be supported by the paper itself and is measured in meters.

Tear factor is the measure of the resistance of a precut paper to being torn and is measured on standard apparatus in arbitrary units.

Consistency is the percent by weight of the total content of solids in the paper stock.

A standard paper stock furnish produced by a representative paper company was employed to provide the data (FIG. 7A) which data compares the performance of a two-pass drive through conventional apparatus with the single pass operation of the apparatus and method of the present invention.

It will be noted that the improved method and apparatus of the present invention utilizes consistencies greater than ten percent (i.e., 20%) thereby requiring less power (i.e., less water to move) and permitting more uniform work on the fibers (i.e., less water to lubricate the fibers).

Figure 8A:
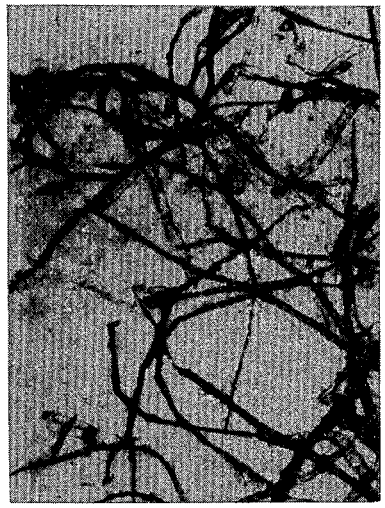
FIGS. 8A, 8B, 8C, 8D, 8E are enlarged photographic illustrations of fibers as introduced into the improved refining apparatus and after being treated in the improved apparatus of the present invention.
Figure 8B:
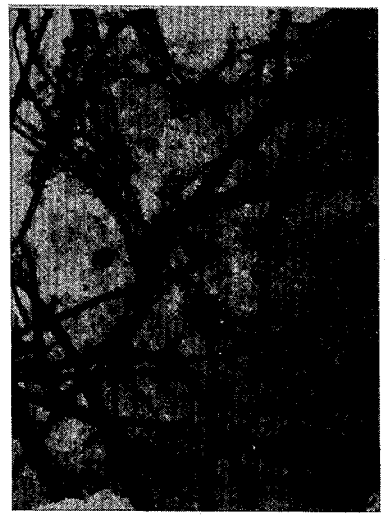
Figure 8C:
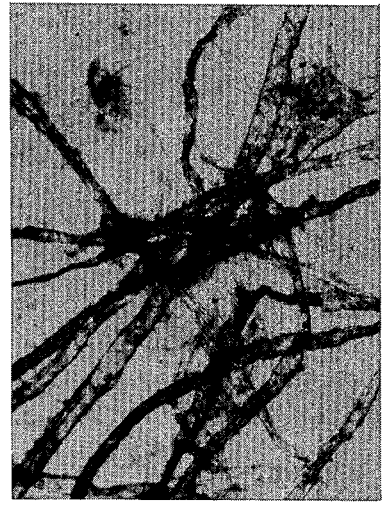

Referring to FIGS. 8A (unrefined paper stock furnish), FIG. 8B (paper stock furnish refined by two-pass conventional refiners) and FIG. 8C (paper stock furnish refined by the method and apparatus of the present invention) it will be noted that (in the paper stock, FIG. 8C, refined by the method and apparatus of the present invention) none of fibers have been broken into small pieces and that the treated fibers (due to the uniform treatment) are uniformly fibrillated and curled.

Figure 7B:
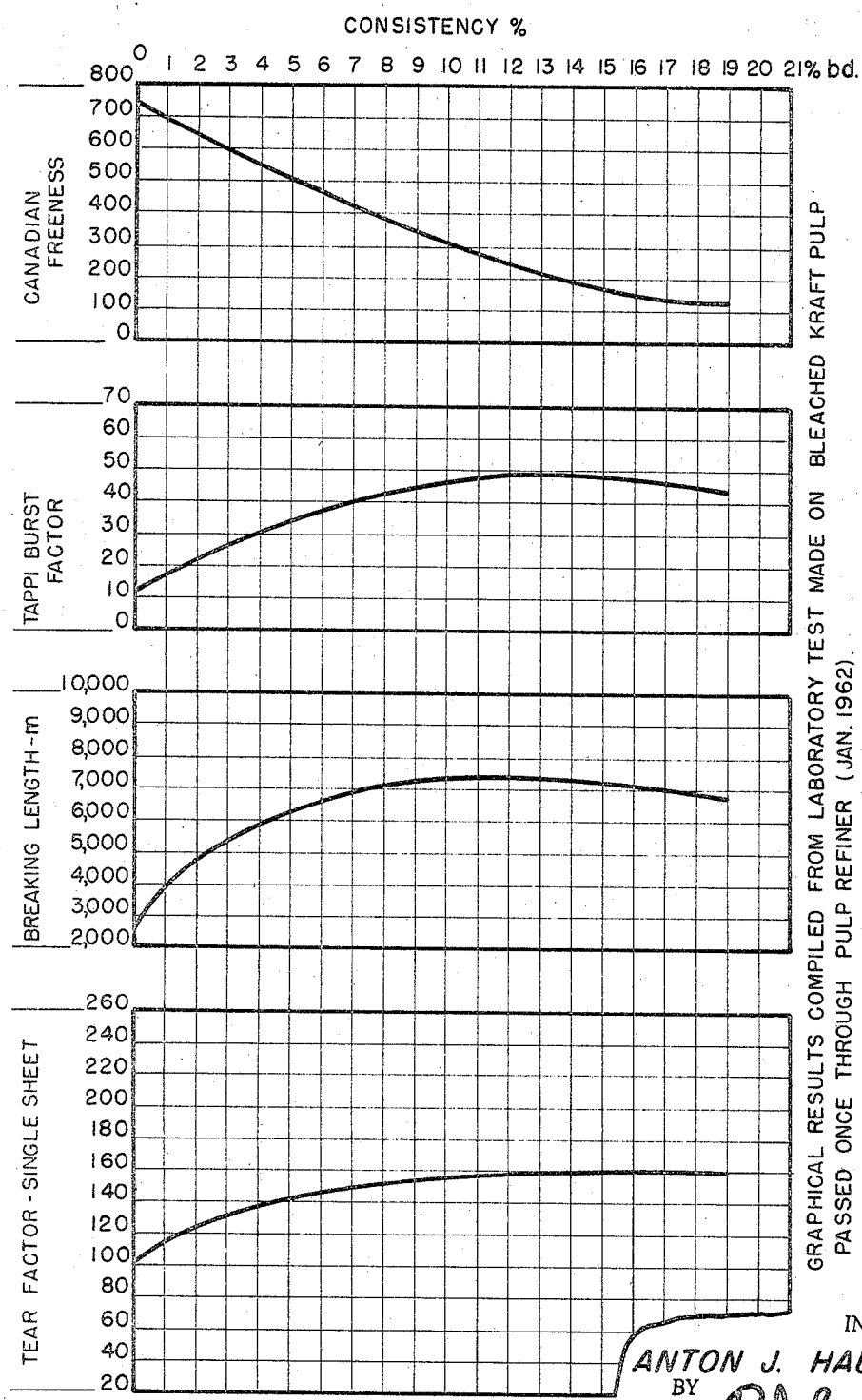
Figure 8D:
Figure 8E:
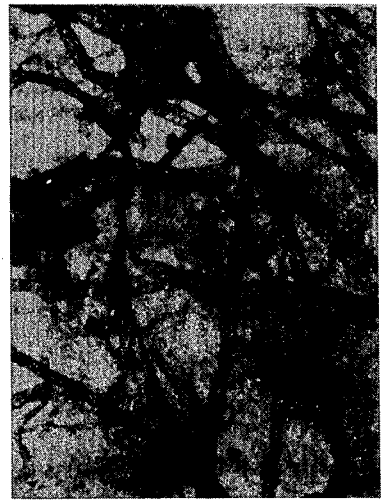

Conventional bleached sulphite paper stock was refined in the apparatus and by the method of the present invention to provide the data plotted in FIG. 7B, which FIG. 7B shows increased tear factor, breaking length and burst factor at consistence greater than ten percent. FIG. 8D shows the paper stock (19% consistency) before and FIG. 8E shows the paper stock after refining by the improved method and apparatus of the present invention. Again improved uniform fibrillation and the absence of cut fibers are the beneficial results without reduction of tear strength.

The increased tear factor and breaking length achieved by the apparatus and method of the present invention is a result of the increased amount of loosened fibrillae on the outer wall of the fiber with attendant increased resistance to the dragging of the fiber structural units apart.

The improved burst factor is achieved by the filling of the interstical spaces between fibers by the increased amount of loosened fibrillae on the outer wall of the fibers.

Because the fiber mass is under hydraulic pressure and moves through the comparatively large clearances between working surfaces on sleeve members 44, 45 (FIG. 1) the machine can handle higher consitencies than is handled normally by conventional equipment. The forces acting on the pulp are more effectively and uniformly used, therefore resulting in lower power consumption for a given requirement.

Figure 2:
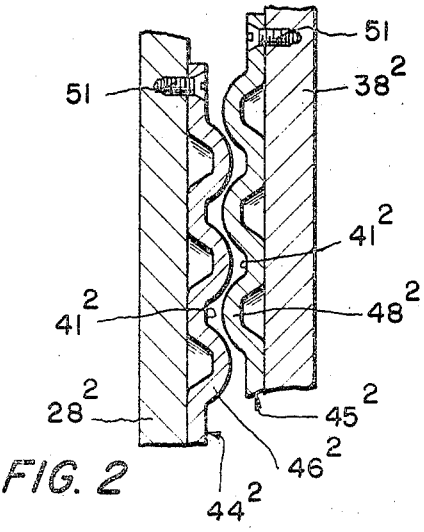
FIG. 2 is a fragmentary side elevational view of the stator and rotor showing such stator and rotor provided with a removable sleeve member having protrusions thereon.

For severe defibering, sleeve members $44^2$, $45^2$ with intermeshing protrusions $46^2$, $48^2$, are placed on the rotor $28^2$ and stator $38^2$ as shown in FIG. 2 to provide a tortuous path with attendant increased or greater severity of impacts.

Figure 3:
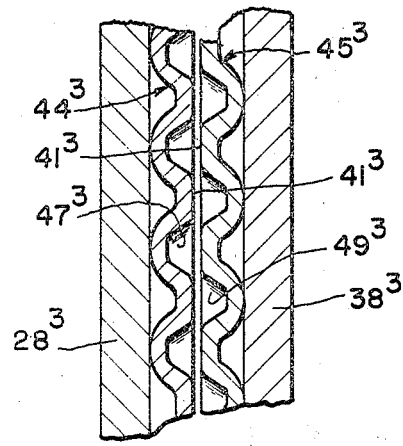
FIG. 3 is a view similar to FIG. 2 showing the stator and rotor provided with sleeve members having smooth surfaces with depressions provided therein.
Figure 4:
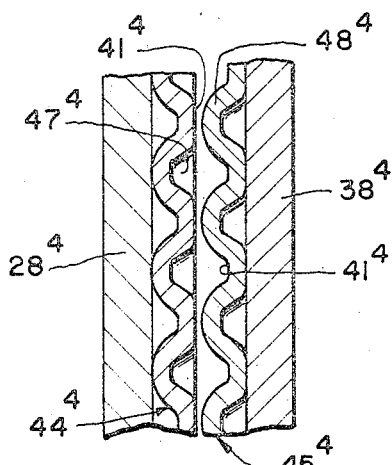
FIG. 4 is a view similar to FIGS. 2 and 3 showing the stator provided with protrusions and the rotor provided with a smooth surface having depressions therein.

For beating action combined with a curling of the fibers both rotor $28^3$ and stator $38^3$ have sleeve members $44^3$, $45^3$ provided with a smooth surface with randomly located depressions $47^3$, $49^3$ as in FIG. 3.

The rolling, compressing and curling of the fibers as they pass between the sleeve members $44^3$, $45^3$ is achieved by the continuous action of the fibers alternately, suddenly expanding in the depression $47^3$, $49^3$ and suddenly compressing between flat working surfaces $41^3$ on the sleeve members $44^3$, $45^3$ without severing of the fibers. As a fiber exits from a depression $47^3$, $49^3$ and enters the land space $41^3$, the fiber receives a differential curling action induced by the increase in the linear speed of the working surfaces in the direction of fiber travel.

For gentle defibering and medium strength (FIG. 4) the protrusions $48^4$ of sleeve member $45^4$ on the stator $38^4$ are randomly aligned with the depressions $47^4$ in sleeve member $44^4$ of the rotor 28.

As a result of this gentle defibering action less defibering but more curling action is achieved with resultant greater strength and lower freeness.

Figure 5:
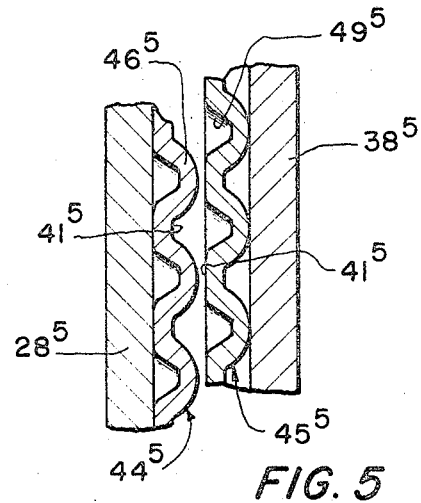
FIG. 5 is a view similar to FIGS. 2-4 showing the stator provided with a smooth surface having depressions therein and the rotor provided with protrusions.

For obtaining defibering combined with a beating action the sleeve member $44^5$ on rotor $28^5$ has protrusions $46^5$ and the sleeve member $45^5$ on the stator $38^5$ has a smooth flat working surface $41^5$ with depressions $59^5$ as in FIG. 5.

The beating action at any instant (wherein some of the fibers are crushed, some are rolled and some are relatively untouched) is caused by the centrifugally directed impacts of the protrusions $46^5$ on the fibers.

As shown in FIGS. 2–6 the sleeve members $44^2$, $45^2$, etc. are removably mounted by screws 51 (FIG. 2) on the rotor $28^2$ and stator $38^2$ thereby permitting quick economical maintenance or change-over for all types of paper stock.

Figure 9:
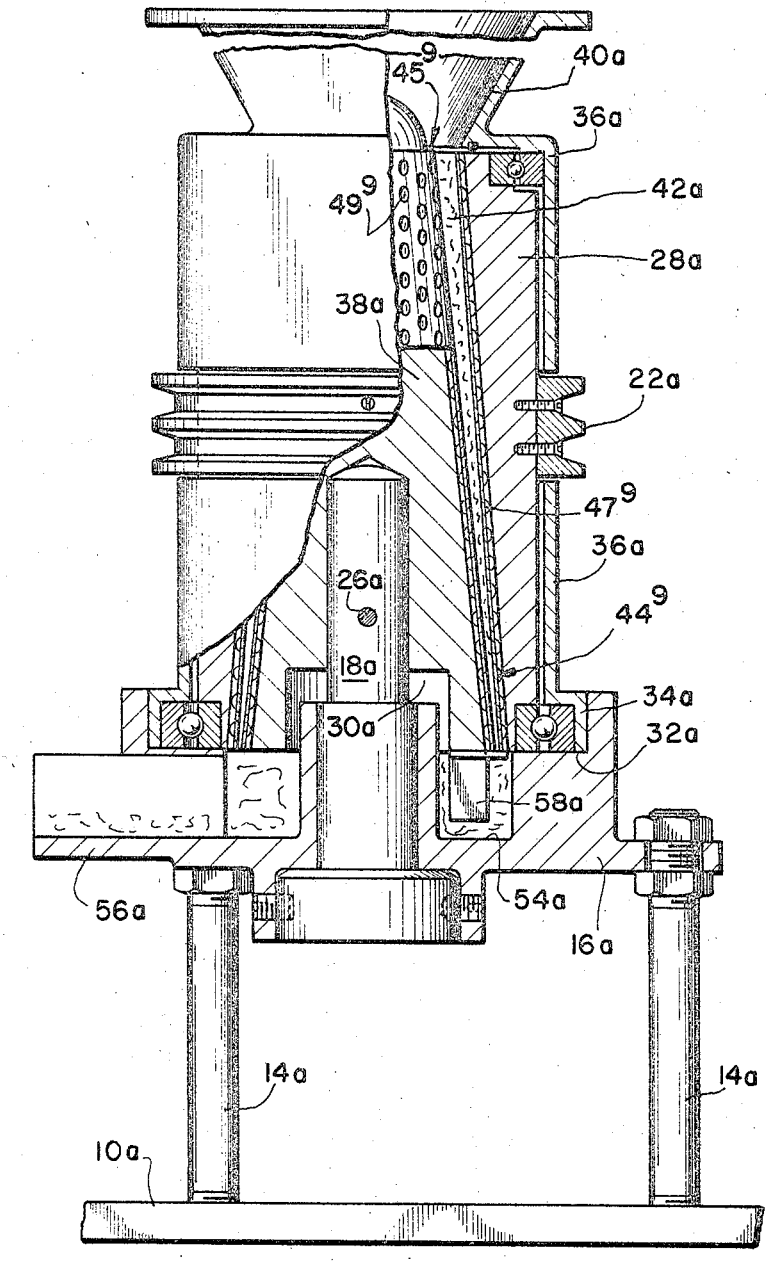
FIG. 9 is a view similar to FIG. 1 showing the outer fiber working member as the driven member.

Referring to FIG. 9 it will be appreciated that the inner fiber working member may be utilized as the stator $38a$ and the outer fiber working member may be driven by means of pulleys $22a$ and utilized as the rotor $28a$.

As shown in FIG. 10 increased hydraulic shocks above 40,000 cycles per second may be obtained by rotating the outer fiber working member $38b$ (driven by pulleys and belts $22b'$) in the opposite direction to the direction of rotation of the inner fiber working member $28b$ (driven by shaft $18b$, pulleys $22b$ and pins $26b$). If, for example, both of the members $28b$ and $38b$ are rotating at the same velocity but in the opposite directions of rotation, as shown in FIG. 10, the number of hydraulic shocks will be doubled. In addition, either the outer fiber working member $38b$ or the inner fiber working member $28b$ may be rotated at a greater r.p.m. than the other but in the same direction of rotation as the other. Further, the apparatus shown in FIG. 10 may be operated as a vertical machine similar to that shown in FIG. 1 or an inclined machine (not shown).

From the above description it will be apparent to those skilled in the art that the number of hydraulic shocks imparted to fibers by the method and apparatus of the present invention is a function of the following:

(1) Relative rotation of inner and outer fiber working elements or members.
(2) Diameter or circumference of the rotor and stator.
(3) Spacing of the protrusions and depressions on the rotor and stator.
(4) Revolutions per minute of the driven members, either outer or inner fiber treating member or both.

Figure 6:
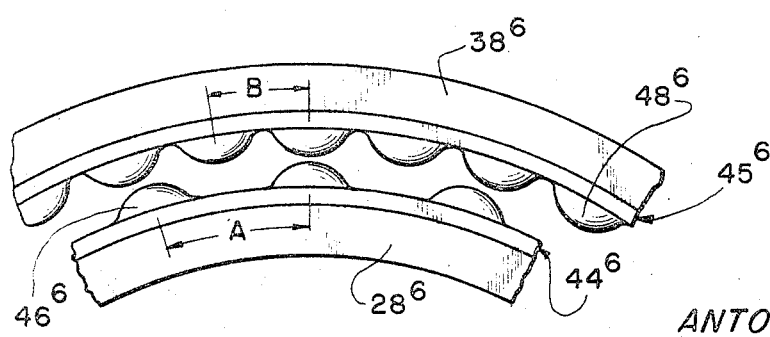
FIG. 6 is a fragmentary plan view showing one example of an arrangement for producing harmonic results and the stator and rotor both provided with protrusions.

FIG. 6 illustrates only one example of an arrangement for generating harmonic waves by increasing the spacing of the protuberances and/or depressions in one of either the stator $38^6$ or rotor $28^6$ with respect to the spacing of such protuberances and/or depressions on the other so that the number of protuberances and/or depressions on said one is not a simple arithmetic multiple of the number of protuberances and/or depressions on the other. For example, one protrusion $48^6$ on the stator $38^6$ is utilized with about 1.78 protrusions $46^6$ on the rotor $28^6$. The pitch "A" between protrusions $46^6$ is 1.78, while the pitch "B" between protrusions $48^6$ is 1.00. It will be understood by those skilled in the art that the embodiments of FIGS. 2–5 may be constructed as is the embodiment of FIG. 6.

It will be understood by those skilled in the art that alternatively the method and apparatus of the present invention may be practiced and used as shown in FIGS. 11–30.

ALTERNATIVE EMBODIMENTS

Figure 10A:
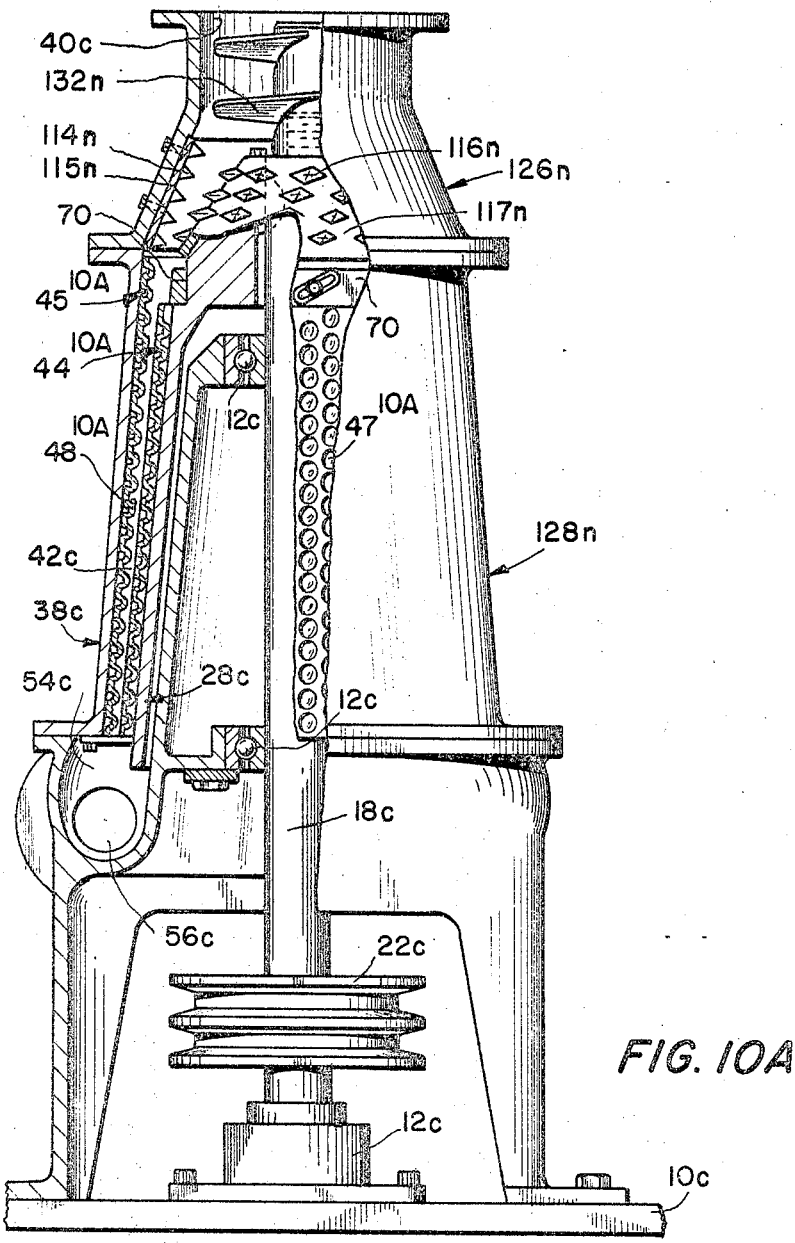
FIG. 10A is a view similar to FIG. 1 showing alternative means for attaching the sleeve members to the rotor and stator.
Figure 10B:
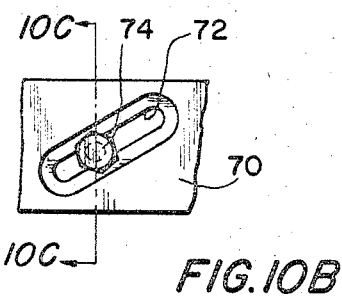
FIG. 10B is a fragmentary enlarged view of the attaching means.
Figure 10C:
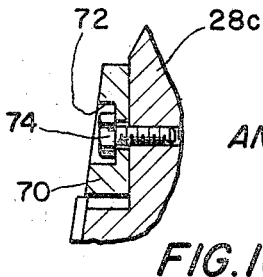
FIG. 10C is a vertical sectional view along the line 10C—10C of FIG. 10B in the direction of the arrows.

Referring to FIGS. 10A, 10B, 10C in order to provide for the positioning and securing of, for example, the sleeve member $44^{10A}$ on the rotor 28c, a collar 70 or a plurality of collar segments (not shown) is provided with an inclined or helical slot 72, and a bolt 74 extends through the slot 72 into the rotor 28c. In order to position the sleeve member $44^{10A}$ on the rotor 28c, the collar 70 is rotated thus forcing the sleeve member $44^{10A}$ onto the rotor 28c in the desired position. Tightening of the bolt 74 locks the sleeve member $44^{10A}$ in the desired position.

If the slot 72 is inclined in a direction opposite to the direction of rotation of the rotor 28c the collar 70 becomes self-tightening.

This positioning device can also be used to attach the sleeve member $45^{10A}$ to the stator 38c.

(A) FIGS. 11, 11A

In this embodiment the pulp or chip inlet 119a is inclined at an angle to the axis of the machine to permit the use of an outboard bearing 124a. The pulp, chips or screen rejects enters the shredding section 126a, having stator teeth 114a of sleeve member 115a on the stator 38d intermeshing with rotor teeth 116a of sleeve member 117a on the rotor 28d. In this shredding section such material is reduced to a fiber size suitable for coarse refining.

Thereafter the material passes successively through a coarse refining section 128a and a fine refining section 130a provided with irregular surfaces, such as the craters shown in U.S. Patent No. 2,749,814 or protrusions or dimples 46" (but similar to FIGS. 2–6).

To permit the introduction of fluids, such as chemical, water, etc., into the sections 126a, 130a or the withdrawal of the material at this point in the process, inlets (and/or outlets) 118a, 120a, 122a are provided.

As shown in FIG. 11 and FIG. 11A rotor positioning means is utilized to raise or lower the rotor 28d and thus adjust the width of the fiber passageway 42d. In the rotor positioning means a worm 76 drives a longitudinally fixed sleeve 78 which sleeve 78 is rotatable by the worm 76. Rotation of the sleeve 78 in a colckwise direction as shown by the arrow causes a bearing sleeve 80 (which meshes with the sleeve 78) to move upwardly as viewed in FIG. 11 and FIG. 11A. The bearing sleeve 80 carries the bearing 82 which is secured thereto by a snap ring 84 and a shoulder 86 in the bearing sleeve 80. The bearing 82 in turn is rotatably connected to the rotor shaft 18d by a snap ring 88 and a collar 90.

This upward movement, for example, of the bearing sleeve 80 also moves the rotor shaft 18d and hence the rotor 28d upwardly also.

(B) FIG. 12

In FIG. 12 the inlet 119b is vertically disposed for uniform distribution of the pulp, chips, etc., as permitted by the use of inboard bearings 124b. Such inlet 119b is provided with screw feeding device 132b to provide a uniform feed to the refining apparatus.

(C) FIG. 13

In FIG. 13 inboard bearings 124c, vertical inlet 119c and screw feeding device 132c are utilized. Further, a horizontal shredding section 126c to reduce the height of the machine and to provide increased centrifugal force, is also employed.

(D) FIGS. 14–15

In FIG. 14 is shown refining apparatus having a flatter fine refining section 130D thereby providing a larger diameter of rotor 28g and stator 38g with attendant reduced machine height; greater speed and frequency of hydraulic shocks, and increased centrifugal force which forces the paper stock downwardly in its effort to seek the largest diameter portion of the rotor 28g and stator 38g as exemplified by laboratory results shown in FIGS. 7A, 7B, 8A–8E.

FIG. 15 illustrates the plan, front elevation and side elevation views of one of the rotor teeth 116k in the shredding section of the rotor as shown on the sleeve member 117k in FIG. 27.

(E) FIGS. 16–18

The two section machine of FIG. 16 comprises a shredding section 126e and a steep angle coarse refining section 128e thus reducing the diameter of the machine for high speed operation with reduced centrifugal stresses on such machine. In order to provide back pressure on the machine thereby insuring that it is always full, either a stand pipe discharge outlet 122e or a restricted opening through a valve 122f is employed.

In FIG. 17 outboard bearings $124e^1$ require the horizontal screw feed device $132e^1$ whereas in FIG. 18 the machine of FIG. 17 is shown disposed in the horizontal position.

(F) FIG. 19

Referring to FIG. 19 which is similar to a portion of FIG. 11 a horizontal restricted branch 142f is provided in the refining aparatus to prevent the "hang-up" or undesirable accumulation of pulp in the discharge passage 56k.

(G) FIGS. 20–22

In FIG. 20 the two section refining apparatus of FIG. 10A is inverted with a drive means 144g mounted on top of the apparatus and utilizing upward flow of the pulp through the shredding section 126g and coarse refining section 128g.

In FIG. 21 and FIG. 22 the rotor 28n is provided with a plurality of steps $146g^1$ (similar to the steps utilized in U.S. Patent 2,749,814) for the abrupt release of the compressive force on the compressed fibers for short intervals during which the fibers seek to untwist or uncurl and revert to a relatively straightened condition. For illustrative purpose only one step $146g^2$ (FIG. 22) is provided with protrusion $46^{22}$ and the other step $146g^2$ is provided with depressions $47^{22}$.

(H) FIG. 23

As shown in FIG. 23 a top mounted drive means 144h permits the use of a cutting section 147h (after the fine refining section 130h) which cutting section 147h comprises a pair of foraminous rotating cylinders 148h and a pair of foraminous stationary cylinders 150h, thereby providing in one apparatus a multiplicity of operations. In addition, cutting section 147h can be used as a filtering device, the fibers passing through foraminous cylinders 148h, 150h. A trap 152h is provided for the collection of heavier impurities, such as sand, grit, etc.

(J) FIGS. 24–26

In order to reduce the size of the refining apparatus and to reduce the effect of centrifugal force on such apparatus, the hydraulic or pressure activated stock (FIG. 24) is returned inwardly by a first return passage 154j (between the shredding section 126j and coarse refining section 128j) and a second return passage 156j (between the coarse refining section 128j and the fine refining section 130j).

The two section vertical machine of (FIG. 25) utilizes a V-shaped or zig-zag cross sectional stock path defined by the shredding section $126j^1$ and coarse refining section $128j^1$.

In FIG. 26 a horizontally disposed V-shaped or zig-zag cross sectional stock path and a horizontal screw feed device $132j^2$ capable of reverse direction is employed.

(K) FIGS. 27–28

FIG. 27 shows an arrangement of (shredding section) rotor teeth $116k$ on sleeve member $117k$ whereas FIG. 28 is a vertical sectional view showing the arrangement of (shredding section) rotor teeth $116k$ with the stator teeth $114k$ in phantom.

(L) FIG. 29

In FIG. 29 a water jacket 158 receives white water through inlet 160 from an adjacent thickener apparatus (not shown) and circulates it outwardly through outlet 162, thereby permitting the introduction of heavier consistency stock into pulp or chip inlet $119k$ without the danger of burning the treated or refined stock.

(M) FIG. 30

In cases where extreme high freeness and bulkiness is desired in the refined paper pulp, the sleeve members $44^{30}$ and $45^{30}$ are provided with the saw tooth protrusions $46^{30}$ and $48^{30}$.

METHOD

It will be apparent to those skilled in the art that an improved method of processing fibrous material has been provided as shown in FIGS. 1–10, which method may be practiced by hand or other apparatus (FIGS. 11–30). This method comprises the steps of conducting a fluid stream of fibrous material through the annular conduit or fiber passageway 42 (FIG. 1) and simultaneously alternately compressing the fibrous material and releasing such fibrous material with rounded surfaces at a rate greater than two hundred cycles per second.

Referring to FIGS. 16–18 such improved method also contemplates the added steps of shredding the fibrous material and then refining the fibrous material.

As shown in FIGS. 11–14 the refining step in the improved method may be divided into a coarse refining step and a fine refining step.

FIG. 19 illustrates the added step to the method shown in FIGS. 16–18 of restricting the discharge from the annular conduit $142f$; FIG. 23 the step of cutting the refined fibrous material to length; FIG. 20 the flow of the fluid stream upwardly through the annular conduit $142g$; FIG. 24 the flow of the fluid stream in a zig-zag path; and FIG. 29 the added step of cooling the annular conduit $142k$.

From the above description it will be apparent to those skilled in the art that the present invention provides a method of treating materials and/or material mixtures of different nature continuously or in charges, such as, for instance, decomposing, fiberizing, pulping, refining, homogenizing and intimately mixing and contacting the particles of the materials or mixtures thereof by tearing, smashing, checking, friction, compressing and dilating. This method includes the steps of: (a) pushing the material or material mixture in a meridional direction through an annular working gap 42 (FIG. 1), whereby the material or material mixture is forced through the working gap 42 at a predetermined meridional speed and (b) subjecting the material or material mixture in the working gap 42 to periodically repetitive shearing pulsation, and cavitation effects in a circumferential direction at a frequency of sonic or ultrasonic level, (c) by continuously controlling and regulating the circumferential speed of the material or material mixture in the working gap as a fraction of the speed at which the pulsation and cavitation effects are propagated through the material or material mixture.

Apparatus is also provided for treating materials and/or material mixtures, and includes: (a) a pressure casing 36 (FIG. 1) having an admission orifice 40 and a discharge orifice 56, (b) two bodies 28, 38 coaxially mounted in the casing 36 for relative rotation around an axis, (c) the bodies 28, 38 having respective annular face portions 44, 45 oppositely arranged to define a working gap 42 therebetween for permitting movement of a material or material mixture therethrough in a direction from the admission orifice 40 to the discharge orifice 56, (d) a plurality of spaced projections $46^2$ (FIG. 2) on each of the face portions $44^2$ extending from one body 28 into the working gap 42 (FIG. 1) for co-operation with the projections $48^2$ (FIG. 2) on the face portion $45^2$ of the other body $38^2$, (e) the projections $46^2$, $48^2$ on each of the face portions $44^2$, $45^2$ being arranged in a plurality of coaxial rows transverse to the direction of the material or material mixture in such a manner that the adjacent faces of the projections $46^2$, $48^2$ of two annular rows form a narrow gap 42 (FIG. 1) adapted for producing oscillations in the material or material mixture, (f) the projections $46^2$, $48^2$ (FIG. 2) on each of the rows being of substantially uniform shape and defining substantially uniform interstices therebetween, (g) the rows of projections $46^2$ (FIG. 2) on one of the face portions $44^2$ being alternately juxtaposed in the direction of the material or material mixture with the rows of projections $48^2$ on the other face portion $45^2$, (h) the cross-section of each projection $46^2$ taken transversely of the direction of the material or material mixture substantially conforming to the corresponding cross-section of the interstices in an adjacent row of projections $48^2$, (i) and means $122e$, $122f$ (FIG. 16) arranged on a narrowed tubular outlet $58h$ for regulating the duration of treatment of the material or material mixture and also defining and controlling in the pressure casing 36 (FIG. 1) a pressure substantially higher than atmospheric pressure.

The method also includes one in which:

(1) the raw material is sorted before entry into the gap 42 (FIG. 1) to influence the fineness of the final product;

(2) the fineness of the final product is influenced by subjecting the material to a rubbing treatment in the gap $42q$ (FIG. 23);

(3) the material is filtered $147h$ (FIG. 23) after the gap $42g$ (FIG. 23);

(4) the material is subjected in at least a part $128h$ (FIG. 23) of the gap $42q$ to effects of lower frequency than that caused by projections $48^{23}$ in other parts $130h$ of the gap $42q$;

(5) the material is subjected to the effects of cooperating shredding projections $114h$, $115h$ (FIG. 23) the gap $42q$;

(6) the material may be subjected after the gap to a sudden expansion or release at the end of section $128h$ (FIG. 23);

(7) the material after expansion is subjected to the effects of a further stage $130h$ of co-operating projections $48^{23}$ and depressions $47^{23}$ (FIG. 23);

(8) the material is subjected to effects with ultrasonic frequencies in this further stage $130h$ of co-operating projections $48^{23}$ and depressions $47^{23}$ (FIG. 23);

(9) additional substances, such as steam, a fluid diluent, a typical digesting fluid, and/or any such similar substance as may be required, are introduced into the working gap $42d$ (FIG. 11) during the process by inlets $119a$, $120a$, $122a$ (FIG. 11).

The improved apparatus may also include apparatus in which:

(1) Two bodies 28, 38 (FIG. 1) together form a conical annular gap 42 with any apex angle desired, the width of the gap 42 being either variable or constant from the admission orifice 40 to the discharge orifice 56;

(2) The two bodies 28, 38 (FIG. 1) together form an annular gap 42 extending along a plane, the width of the gap 42 being either variable or constant from the admission orifice 40 to the discharge orifice 56;

(3) The gap 42 (FIG. 1) is undulated;

(4) An annular collector channel 54a (FIG. 9), 54i (FIG. 17) is provided at the end of the gap 42a, 42i;

(5) At least one pump blade 58a (FIG. 1), 58i (FIG. 17) is mounted on the rotatable body 28a, 28i to run in the collector channel 54a, 54i;

(6) A sieve or filter device 147h, 148h, 150h (FIG. 23) is arranged after the gap 42q;

(7) The sieve or filter device 147h, 148h, 150h (FIG. 23) comprises a casing having an outlet 56q and a partition wall 147h, 150h for the discharge of the material;

(8) The collector channel 152h (FIG. 23) is provided with permeable filter or sieve walls 148h;

(9) An inlet 122a (FIG. 11) is provided from a container, or another such source, for supplying gas for bleaching the material leaving the apparatus;

(10) At least the rotating body 28d (FIG. 11) comprises beating and tearing members 116a projecting into the gap;

(11) Beating and tearing members 114a (FIG. 11) are arranged on the other body 38d, projecting into the container and cooperating with the beating and tearing members 116a of the rotating body 28d and, if desired, being shaped as guide baffles;

(12) The two bodies 28d, 38d (FIG. 11) are in such a position relatively to each other at the end of the gap 42d that friction occurs within the material;

(13) At least one of the bodies 28d, 38d (FIG. 11) at the end of the gap has a sleeve portion $44^{11}$, $45^{11}$ with a friction layer;

(14) A device (FIG. 11A) is provided for adjusting the reciprocal axial position of the two bodies 28d, 38d;

(15) The reciprocal vertical distance of the axes of two co-operating rows of projections $46^{11}$, $48^{11}$ (FIG. 11) is adjustable (FIGS. 10A–10C);

(16) The free ends of the projections 116a (FIG. 11) of the one body 28d engage in grooves of the other body 38d;

(17) At least some of the projections $44^{30}$, $45^{30}$ (FIG. 30) are shaped as saw teeth;

(18) The cooperating projections $46^{11}$, $48^{11}$ (FIG. 11) constitute one of several working stages 128a, 130a (FIG. 11);

(19) A stage 128b (FIG. 12) with co-operating projections $48^{12}$ is followed by a conical stage 130b of larger apex angle (FIG. 12);

(20) The conical stage 128d (FIG. 14) with larger apex angle is followed by stage 130d with smaller apex angle, if desired with an apex angle of the value 0.

(21) The end of the gap 42g (FIG. 14) at stage 128d is immediately followed by an expanding or releasing space before stages 13d;

(22) The expanding space between stages 128d, 130d (FIG. 14) is followed by a further stage 130d having co-operating projections $48^{14}$ and preferably working at ultrasonic frequencies;

(23) The annular space 42g (FIG. 14) receiving the co-operating projections $48^{14}$ of the stage 130d following the expanding space between stages 128d, 130d lies at an angle to the previous gap 42g;

(24) At least some of the prejections $46^2$, $48^2$ (FIG. 2) of at least one body $28^2$, $38^2$ are carried on replaceable rings $44^2$, $45^2$ or are individual replaceable;

(25) At least one inlet 119a (FIG. 11) is provided directed to the working gap 42d.

It will be recognized by those skilled in the art that the objects of the present invention have been achieved by providing an improved refining method and apparatus which provides adequate fibrillation, does not sever the refined fibers unless desired; does not change the characteristics of the treated fibers in a deleterious manner; is adapted to provide refinement for all types of fibrous material and quality control over individual types of fibers; utilizes a low horsepower/ton of refined fiber; is inexpensive to maintain and is reliable in operation; provides quiet and vibrationless operation; is simple and rugged in structure and occupies a minimum of factory floor space. Further, the improved method and apparatus produces controlled refinement of fibrous material heretofore obtained conventionally by a plurality of refiners in series. Again the apparatus is adapted to receive stock of higher consistencies than conventional apparatus. Also, the method and apparatus increases the refining effect and the fluidity of the stock under treatment with resultant improved fibrillation and hydration, the improved apparatus being smaller than conventional apparatus and operable at lower horsepower than conventional apparatus. By utilizing inexpensive readily removable working surfaces on the fiber working members, the cost of and time for maintenance is reduced. The apparatus is adapted to permit the introduction of chemicals, water, etc., at various stages thereof and the removal of refined stock at any desired stage.

In addition, the apparatus causes the settling out of grit and heavy dirt, screens the stock and shortens the refined stock if desired. The improved method and apparatus produce improved characteristics in the end product paper, such as, bursting strength and freeness, when compared with paper produced by conventional methods and apparatus. Further, the improved method and apparatus treats or works the fibers under hydraulic pressure and is adapted to fit into modern high speed pulp preparation systems. Again, the improved method and apparatus separates the fiber bundles without fracture but is operable to shorten the refined fibers for certain paper sheet requirements. Finally, the improved method and apparatus is adapted to produce paper making pulps covering the entire range of requirements in the paper industry.

While in accordance with the patent statutes a preferred and alternative embodiments of the present invention have been illustrated and described in detail, it is to be particularly understood that the invention is not limited thereto or thereby.

What is claimed is:

1. Apparatus for processing a fluid mass of fibrous material having inlet means to receive the mass to be processed and outlet means axially spaced from the inlet means to discharge the processed mass, comprising:

(a) a pair of working members concentrically spaced one within the other each providing at least one annular working face in spaced face to face relation with a corresponding working face of the other of the pair of working members to define an annular passage extending axially betwen the inlet and outlet means;

(b) each of the working faces having a plurality of spaced surface deformations each of which is a substantially hemispherical protrusion extending into the annular passage and terminating radially short, during relative rotation between the working members, from protrusions extending into the annular passage from the corresponding working face;

(c) the spaced corresponding working faces and the deformations thereof operatively co-operating to create shock pulses during relative rotation between the pair of working members to process the mass therebetwen moving through the passage from the inlet means to the outlet means; and (d) means for providing relative rotation between the pair of working members to cause such operative co-operation betwene each pair of spaced corresponding working faces.

2. The apparatus in accordance with claim 1, wherein: one of the pair of working members has a plurality of steps disposed in annular series each extending axially along its lentgh and through its working faces for abruptly relieving compression in the annular passage.

3. The apparatus in accordance with claim 1, wherein: the working faces each form a conical surface having a smaller diameter at the inlet end than the diameter at the outlet end and each conical surface of a pair of face working faces has an angle of convergence one of which is larger than the other.

4. Apparatus for processing a fluid mass of fibrous material having inlet means to receive the mass to be processed and outlet means axially spaced from the inlet means to discharge the processed mass, comprising:

(a) a pair of working members concentrically spaced one within the other each providing at least one annular working face in spaced face to face relation with a corresponding working face of the other of the pair of working members to define an annular passage extending axially between the inlet and outlet means;

(b) each of the working faces having a plurality of spaced surface deformations wherein the deformations are substantially hemispherical recesses in one of the spaced annular working faces and are substantially hemispherical protrusions extending from the other of the spaced annular working faces;

(c) the spaced corresponding working faces and the deformations thereof operatively co-operating to create shock pulses during relative rotation between the pair of working members to process the mass therebetween moving through the passage from the inlet means to the outlet means; and (d) means for providing relative rotation between the pair of working members to cause such operative cooperation between the spaced corresponding working faces.

5. The apparatus in accordance with claim 4, wherein: the working faces each form a conical surface having a smaller diameter at the inlet end than the diameter at the outlet end and each conical surface of a pair of face to face working faces has an angle of convergence one of which is larger than the other.

6. The apparatus in accordance with claim 1, wherein: each working member has a plurality of working faces and the diameter of the annular passage varies sufficiently, increasing and decreasing in size along its length to form an annular zig-zag path with a plurality of annular portions each having a smaller diameter at its inlet end than the diameter at its discharge end; and the working faces being disposed along such portions.

7. The apparatus in accordance with claim 1 in which the pair of working members have shredding means disposed between the inlet means and the working faces forming an entrance to the annular passage for breaking up relatively large slivers and chips entrained in the fluid mass of fibrous material to be processed.

8. The apparatus in accordance with claim 7, and: screw means disposed in the inlet means for positive feeding of the fluid mass of fibrous material to be processed into the shredding means during relative rotation between the working members.

9. The apparatus in accordance with claim 7, wherein: the shredding means is disposed in a plane normal to the axis of the pair of working members.

10. The apparatus in accordance with claim 1, and: a plurality of foraminous members disposed between the working faces and the outlet means across the path of flow of the processed fluid mass of fibrous material to be discharged and through which it must flow; and the foraminous members being rotated relative to one another by relative rotation between the working members for cutting the fluid mass of fibrous material as it passes therethrough.

11. The apparatus in accordance with claim 10, wherein: the foraminous members are at least one pair of concentrically disposed perforated cylinders.

12. The apparatus in accordance with claim 11, and: the pair of working members having shredding means disposed between the inlet means and the working faces forming an entrance of the annular passage for breaking up relatively large slivers and chips entrained in the fluid meass of fibrous material to be processed.

13. The apparatus in accordance with claim 1 including cutting means adjacent said outlet means for cutting the fibrous material.

14. The apparatus in accordance with claim 4, wherein: one of the pair of working members has a plurality of steps disposed in annular series each extending axially along its length and through its working faces for abruptly relieving compression in the annular passage.

15. The apparatus in accordance with claim 4, in which the pair of working members have shredding means disposed between the inlet means and the working faces forming an entrance to the annular passage for breaking up relatively large slivers and chips entrained in the fluid mass of fibrous material to be processed.

16. The apparatus in accordance with claim 4, and: screw means disposed in the inlet means for positive feeding of the fluid mass of fibrous material to be processed into the shredding means during relative rotation between the working members.

17. The apparatus in accordance with claim 4, wherein: the shredding means is disposed in a plane normal to the axis of the pair of working members.

18. The apparatus in accordance with claim 4, and: a plurality of foraminous members disposed between the working faces and the outlet means across the path of flow of the processes fluid mass of fibrous material to be discharged and through which it must flow; and the foraminous members being rotated relative to one another by relative rotation between the working members for cutting the fluid mass of fibrous material as it passes therethrough.

19. The apparatus in accordance with claim 18, wherein: the foraminous members are at least one pair of concentrically disposed perforated cylinders.

20. The apparatus in accordance with claim 19, and; the pair of working members having shredding means disposed between the inlet means and the working faces forming an entrance of the annular passage for breaking up relatively large slivers and chips entrained in the fluid mass of fibrous material to be processed.

21. The apparatus in accordance with claim 4 including cutting means adjacent said outlet means for cutting the fibrous material.

22. The apparatus in accordance with claim 1, wherein: each working member has a plurality of annular working faces, the working faces on each working member disposed axially relative to one another, each working face on one working member is in face to face relation with a corresponding working face of the other working member and the deformations of a pair of face to face working faces are substantially the same size but different in size from the deformations of another pair of face to face working faces.

23. The apparatus in accordance with claim 4, wherein: each working member has a plurality of annular working faces, the working faces on each working member disposed axially relative to one another, each working face on one working member is in face to face relation with a corresponding working face of the other working member and the deformations of a pair of face to face working faces are of substantially the same size but different in size from the deformations of another pair of face to face working faces.

24. The apparatus in accordance with claim 4, wherein:
each working member has a plurality of working faces and the diameter of the annular passage varies sufficiently, increasing and decreasing in size along its length to form an annular zig-zag path with a plurality of annular portions each having a smaller diameter at its inlet end than the diameter at its discharge end; and
the working faces being disposed along such portions.

References Cited
UNITED STATES PATENTS

| | | | |
|---|---|---|---|
| 320,486 | 6/1885 | Malcolm | 241—251 |
| 1,846,061 | 2/1932 | Marshall | 241—255 |
| 1,873,199 | 8/1932 | Haskell | 241—256 |
| 2,749,814 | 6/1956 | Haug | 19—66 |
| 2,807,989 | 10/1957 | Schaan et al. | 251—255 |

FOREIGN PATENTS 952,590  11/1956  Germany.

MERVIN STEIN, *Primary Examiner.*

D. NEWTON, *Assistant Examiner.*

U.S. Cl. X.R.

241—251, 255